US012641454B2

(12) United States Patent
Liu et al.

(10) Patent No.: US 12,641,454 B2
(45) Date of Patent: May 26, 2026

(54) RADIO ACCESS NETWORK (RAN)-CENTRIC DATA COLLECTION FOR DUAL CONNECTIVITY (DC)/CARRIER AGGREGATION (CA)

(71) Applicant: QUALCOMM Incorporated, San Diego, CA (US)

(72) Inventors: Huichun Liu, San Diego, CA (US); Gavin Bernard Horn, La Jolla, CA (US); Peng Cheng, Beijing (CN); Xipeng Zhu, San Diego, CA (US)

( * ) Notice: Subject to any disclaimer, the term of this patent is extended or adjusted under 35 U.S.C. 154(b) by 304 days.

(21) Appl. No.: 17/760,426

(22) PCT Filed: Feb. 15, 2020

(86) PCT No.: PCT/CN2020/075447
§ 371 (c)(1),
(2) Date: Aug. 9, 2022

(87) PCT Pub. No.: WO2021/159545
PCT Pub. Date: Aug. 19, 2021

(65) Prior Publication Data
US 2023/0071803 A1     Mar. 9, 2023

(51) Int. Cl.
*H04W 24/08* (2009.01)
*H04W 24/10* (2009.01)

(52) U.S. Cl.
CPC ........... *H04W 24/08* (2013.01); *H04W 24/10* (2013.01)

(58) Field of Classification Search
None
See application file for complete search history.

(56) References Cited

U.S. PATENT DOCUMENTS

| 2012/0088457 | A1* | 4/2012 | Johansson | ............. | H04W 24/10 |
| | | | | | 455/67.11 |
| 2013/0130627 | A1 | 5/2013 | Fukuta | | |
| 2020/0403743 | A1* | 12/2020 | Bergqvist | ............. | H04B 7/0695 |
| 2021/0345144 | A1* | 11/2021 | Yang | .................... | H04W 24/10 |

(Continued)

FOREIGN PATENT DOCUMENTS

| CN | 102752787 A | 10/2012 |
| CN | 102932823 A | 2/2013 |

(Continued)

OTHER PUBLICATIONS

"Minimization of drive tests solution in 3GPP" by Wuri A. Hapsari, Anil Umesh, Mikio Iwamura, Malgorzata Tomala, Bodog Gyula, Benoist Sebire. IEEE Communications Magazine (vol. 50, Issue 6), pp. 28-36; Jun. 2012.*

(Continued)

*Primary Examiner* — Xavier S Wong

(57) ABSTRACT

This disclosure provides systems, methods, and apparatus, including computer programs encoded on computer storage media, for wireless communication. In one aspect of the disclosure, a method for wireless communication includes determining, by a user equipment (UE), a minimization of drive test (MDT) result and determining, by the UE, an early measurement result. The method further includes transmitting, by the UE, a report including the MDT result, the early measurement result, or a combination thereof. Other aspects and features are also claimed and described.

23 Claims, 9 Drawing Sheets

*600*

(56) References Cited

U.S. PATENT DOCUMENTS

| | | | | |
|---|---|---|---|---|
| 2022/0124532 A1* | 4/2022 | Rugeland | ............. | H04W 76/27 |
| 2023/0057408 A1* | 2/2023 | Ramachandra | ....... | H04W 24/02 |

FOREIGN PATENT DOCUMENTS

| | | |
|---|---|---|
| CN | 102938905 A | 2/2013 |
| CN | 103313300 A | 9/2013 |
| CN | 106537846 A | 3/2017 |
| CN | 108924866 A | 11/2018 |
| CN | 110337122 A | 10/2019 |
| EP | 2437540 A1 | 4/2012 |
| EP | 2621114 A1 | 7/2013 |
| EP | 3100500 A1 | 12/2016 |
| EP | 3300429 A1 | 3/2018 |
| EP | 3598790 A1 | 1/2020 |
| WO | WO-2011120199 A1 | 10/2011 |

OTHER PUBLICATIONS

CATT: "Fallback mechanisum for fast recovery", R2-1906921, 3rd Generation Partnership Project, Mobile Competence Centre, 650, Route Des Lucioles, F-06921 Sophia-Antipolis Cedex, France, vol. RAN WG2, No. Reno, USA, May 13, 2019-May 17, 2019, May 3, 2019, 3 Pages, XP051711220, Paragraphs 1 and 2, fig 1.

Huawei., et al., "Discussion on delay measurement and collection", R2-1915858, 3rd Generation Partnership Project, Mobile Competence Centre, 650, Route Des Lucioles, F-06921 Sophia-Antipolis Cedex, France, vol. RAN WG2, No. Reno, Nevada, USA, Nov. 18, 2019-Nov. 22, 2019, Nov. 8, 2019, XP051817427, 11 Pages, Paragraphs 2.2, 2.3 and 3.

Huawei, et al., "Discussion on delay measurements for MR-DC and CA", R2-2001373, 3rd Generation Partnership Project, Mobile Competence Centre, 650, Route Des Lucioles, F-06921 Sophia-Antipolis Cedex, France, vol. RAN WG2, No. Electronic meeting, Feb. 24, 2020-Mar. 6, 2020, Feb. 14, 2020, 5 Pages, XP052356526, Paragraphs 2.1 and 3.

OPPO: "Fast MCG recovery for MR-DC enhancement", R2-1905590, 3rd Generation Partnership Project, Mobile Competence Centre, 650, Route Des Lucioles, F-06921 Sophia—Antipolis Cedex, France, vol. RAN WG2, No. Reno, USA, Apr. 13, 2019-Apr. 17, 2019, Apr. 30, 2019, 4 Pages, XP051709948, Paragraphs 1 to 3.

Qualcomm Incorporated: "Remaining Issues of UL PDCP Packet Average Queuing Delay Measurement", R2-2000000, 3rd Generation Partnership Project, Mobile Competence Centre, 650, Route Des Lucioles, F-06921 Sophia-Antipolis Cedex, France, vol. RAN WG2, No. electronic, Feb. 24, 2020-Mar. 6, 2020, Feb. 12, 2020, 5 Pages, XP052355172, Paragraphs 2.1, 2.3 and 3.

Supplementary European Search Report—EP20918472—Search Authority—Munich—Feb. 5, 2024.

VIVO: "Fast recovery failure indication", R2-2000301, 3rd Generation Partnership Project, Mobile Competence Centre, 650, Route Des Lucioles, F-06921 Sophia-Antipolis Cedex, France, vol. RAN WG2, No. Electronic meeting, Feb. 24, 2020-Mar. 6, 2020, Feb. 14, 2020, 4 Pages, XP052355481, Paragraphs 1 to 3.

Supplementary Partial European Search Report—EP20918472—Search Authority—Munich—Sep. 28, 2023.

International Search Report and Written Opinion—PCT/CN2020/075447—ISA/EPO—Nov. 5, 2020.

ZTE Corporation., et al., "Discussion on MDT in DC Scenario", 3GPP TSG-RAN WG2 Meeting #107bis, R2-1913072, Chongqing, China, Oct. 14-18, 2019, Oct. 18, 2019(Oct. 18, 2019), 3 Pages.

Samsung: "MDT For Early Measurments Logged, Immediate)", 3GPP TSG-RAN WG2#108 meeting, R2-1915734, Reno, USA, Nov. 14-18, 2019, 3 Pages, Section 1-2.

European Search Report—EP26151225—Search Authority—Munich—Feb. 9, 2026.

Qualcomm Incorporated: "Fast Recovery from MCG Failure", 3GPP TSG-RAN WG2 Meeting #105bis, R2-1903067, 3rd Generation Partnership Project, Mobile Competence Centre, 650, Route Des Lucioles, F-06921 Sophia-Antipolis Cedex, France, vol. RAN WG2, No. Xi'an, China, Apr. 8, 2019-Apr. 12, 2019, Apr. 6, 2019, 4 Pages, XP051700424, Pargraphs 2 and 3.

* cited by examiner

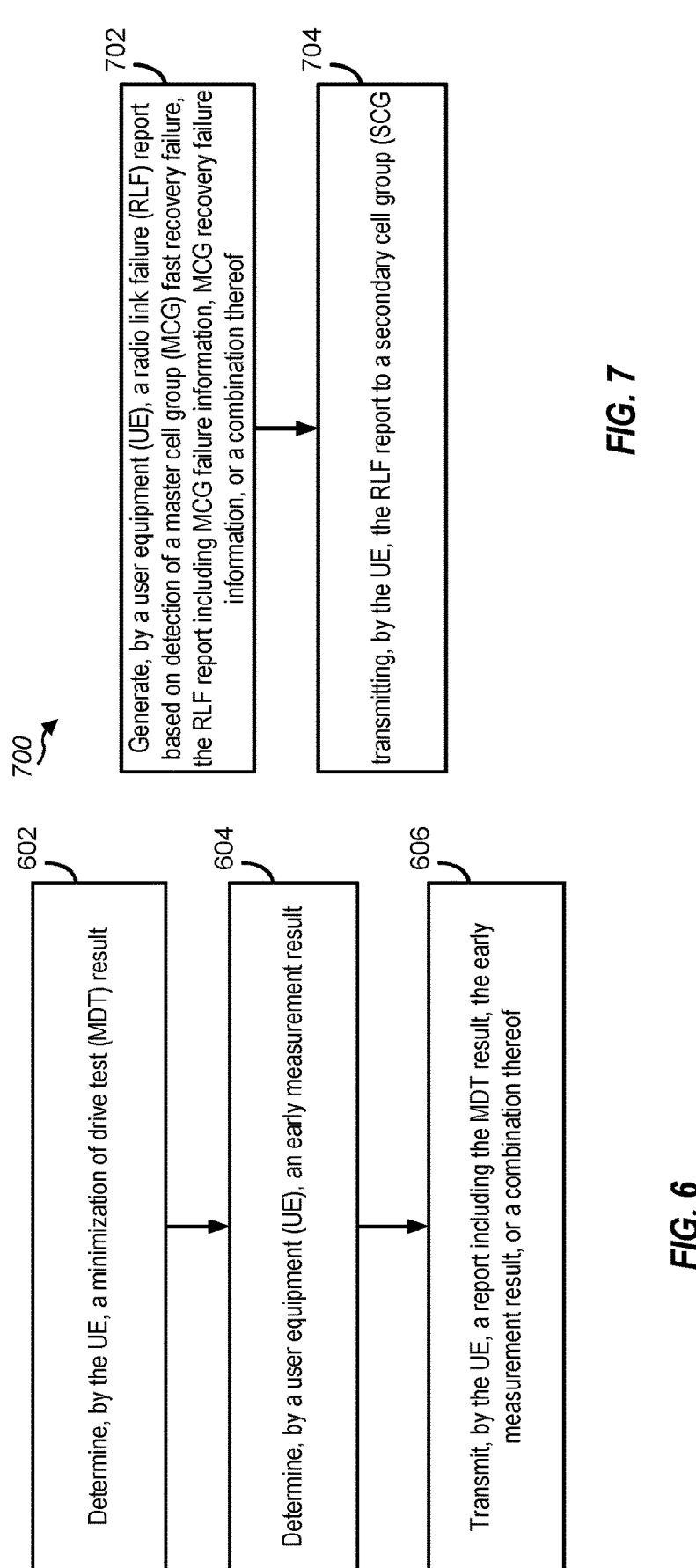

700

702
Generate, by a user equipment (UE), a radio link failure (RLF) report based on detection of a master cell group (MCG) fast recovery failure, the RLF report including MCG failure information, MCG recovery failure information, or a combination thereof 704
transmitting, by the UE, the RLF report to a secondary cell group (SCG

602
Determine, by the UE, a minimization of drive test (MDT) result

604
Determine, by a user equipment (UE), an early measurement result

606
Transmit, by the UE, a report including the MDT result, the early measurement result, or a combination thereof

*FIG. 6*

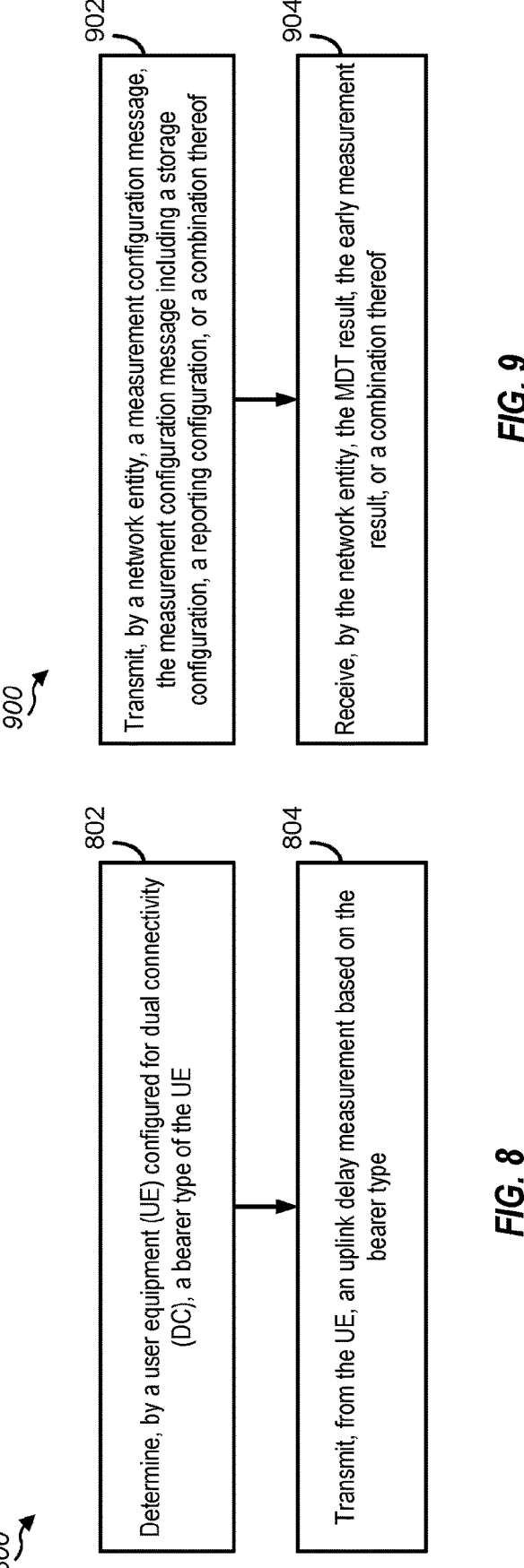

902

Transmit, by a network entity, a measurement configuration message, the measurement configuration message including a storage configuration, a reporting configuration, or a combination thereof

904

Receive, by the network entity, the MDT result, the early measurement result, or a combination thereof

Determine, by a user equipment (UE) configured for dual connectivity (DC), a bearer type of the UE

804

Transmit, from the UE, an uplink delay measurement based on the bearer type

RADIO ACCESS NETWORK (RAN)-CENTRIC DATA COLLECTION FOR DUAL CONNECTIVITY (DC)/CARRIER AGGREGATION (CA)

CROSS-REFERENCE TO RELATED APPLICATIONS

This application claims the benefit of International Patent Application No. PCT/CN2020/075447, entitled, "RADIO ACCESS NETWORK (RAN)-CENTRIC DATA COLLECTION FOR DUAL CONNECTIVITY (DC)/CARRIER AGGREGATION (CA)," filed on Feb. 15, 2020, which is expressly incorporated by reference herein in its entirety.

TECHNICAL FIELD

Aspects of the present disclosure relate generally to wireless communication systems, and more particularly, but without limitation, to data collection for dual connectivity (DC)/carrier aggregation (CA).

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications. For example, research and development has helped advance New Radio (NR) technology, which leverages beam management, Bandwidth Part (BWP), RRC_INACTIVE, Multi-Radio Access Technology (RAT) Dual Connectivity (MR-DC), and Dual Connectivity (DC)/Carrier Aggregation (CA). However, incorporating NR technology with conventional technologies presents a variety of challenges and obstacles. To illustrate, challenges exist for incorporating NR technology in a device and improve device performance with respect to the NR technology. As specific, non-limiting examples, incorporation of the NR technology into devices has presented related to battery life, throughput, latency, reliability.

BRIEF SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wireless communication includes determining, by a user equipment (UE), a minimization of drive test (MDT) result and determining, by the UE, an early measurement result. The method further includes transmitting, by the UE, a report including the MDT result, the early measurement result, or a combination thereof.

In an additional aspect of the disclosure, an apparatus for wireless communication including means for determining, by a user equipment (UE), a minimization of drive test (MDT) result. The apparatus also includes means for determining, by the UE, an early measurement result. The apparatus further includes means for transmitting, by the UE, a report including the MDT result, the early measurement result, or a combination thereof.

In an additional aspect of the disclosure, a non-transitory computer-readable medium having program code recorded thereon. The program code includes code to determine a minimization of drive test (MDT) result and determine an early measurement result, and initiate transmission of a report including the MDT result, the early measurement result, or a combination thereof.

In additional aspect of the disclosure, an apparatus configured for wireless communication is disclosed. The apparatus includes at least one processor, and a memory coupled to the processor. The processor is configured to determine a minimization of drive test (MDT) result and determine an early measurement result. The processor is further configured to initiate transmission of a report including the MDT result, the early measurement result, or a combination thereof.

In an additional aspect of the disclosure, an apparatus configured for wireless communication is disclosed. The apparatus includes an interface (e.g., a transmitter, a receiver, etc.) configured for wireless communication and a processor system coupled to the interface. The processor system is configured to determine a minimization of drive test (MDT) result and determine an early measurement result, and initiate transmission of a report including the MDT result, the early measurement result, or a combination thereof.

In an additional aspect of the disclosure, a method for wireless communication includes transmitting, by a network entity, a measurement configuration message. The measurement configuration message includes: a storage configuration for a minimization of drive test (MDT) result, an early measurement result, or a combination thereof; a reporting configuration for the MDT result, the early measurement result, or a combination thereof; or a combination of the storage configuration and the reporting configuration. The method further includes receiving, by the network entity, the MDT result, the early measurement result, or a combination thereof.

In an additional aspect of the disclosure, an apparatus for wireless communication including means for transmitting, by a network entity, a measurement configuration message. The measurement configuration message includes: a storage configuration for a minimization of drive test (MDT) result, an early measurement result, or a combination thereof; a reporting configuration for the MDT result, the early measurement result, or a combination thereof; or a combination of the storage configuration and the reporting configuration. The apparatus also includes means for receiving, by the network entity, the MDT result, the early measurement result, or a combination thereof.

In an additional aspect of the disclosure, a non-transitory computer-readable medium having program code recorded thereon. The program code includes code to transmit a measurement configuration message. The measurement configuration message includes: a storage configuration for a minimization of drive test (MDT) result, an early measurement result, or a combination thereof; a reporting configuration for the MDT result, the early measurement result, or a combination thereof; or a combination of the storage configuration and the reporting configuration. The program code also includes code to receive the MDT result, the early measurement result, or a combination thereof.

In an additional aspect of the disclosure, an apparatus configured for wireless communication is disclosed. The apparatus includes at least one processor, and a memory coupled to the processor. The processor is configured to initiate transmission of a measurement configuration message. The measurement configuration message includes: a storage configuration for a minimization of drive test (MDT) result, an early measurement result, or a combination thereof; a reporting configuration for the MDT result, the early measurement result, or a combination thereof; or a combination of the storage configuration and the reporting configuration. The processor is further configured to receive the MDT result, the early measurement result, or a combination thereof.

In an additional aspect of the disclosure, an apparatus configured for wireless communication is disclosed. The apparatus includes an interface (e.g., a transmitter, a receiver, etc.) configured for wireless communication and a processor system coupled to the interface. The processor system is configured to initiate transmission of a measurement configuration message. The measurement configuration message includes: a storage configuration for a minimization of drive test (MDT) result, an early measurement result, or a combination thereof; a reporting configuration for the MDT result, the early measurement result, or a combination thereof; or a combination of the storage configuration and the reporting configuration. The processor system is further configured to receive the MDT result, the early measurement result, or a combination thereof.

In an additional aspect of the disclosure, a method for wireless communication includes generating, by a user equipment (UE), a radio link failure (RLF) report based on detection of a master cell group (MCG) fast recovery failure. The RLF report includes MCG failure information, MCG recovery failure information, or a combination thereof. The method further includes transmitting, by the UE, the RLF report to a secondary cell group (SCG).

In an additional aspect of the disclosure, an apparatus for wireless communication including means for generating, by a user equipment (UE), a radio link failure (RLF) report based on detection of a master cell group (MCG) fast recovery failure. The RLF report includes MCG failure information, MCG recovery failure information, or a combination thereof. The apparatus also includes means for transmitting, by the UE, the RLF report to a secondary cell group (SCG).

In an additional aspect of the disclosure, a non-transitory computer-readable medium having program code recorded thereon. The program code includes code to generate a radio link failure (RLF) report based on detection of a master cell group (MCG) fast recovery failure. The RLF report includes MCG failure information, MCG recovery failure information, or a combination thereof. The program code also includes code to initiate transmission of the RLF report to a secondary cell group (SCG).

In an additional aspect of the disclosure, an apparatus configured for wireless communication is disclosed. The apparatus includes at least one processor, and a memory coupled to the processor. The processor is configured to generate a radio link failure (RLF) report based on detection of a master cell group (MCG) fast recovery failure. The RLF report includes MCG failure information, MCG recovery failure information, or a combination thereof. The processor is further configured to initiate transmission of the RLF report to a secondary cell group (SCG).

In an additional aspect of the disclosure, an apparatus configured for wireless communication is disclosed. The apparatus includes an interface (e.g., a transmitter, a receiver, etc.) configured for wireless communication and a processor system coupled to the interface. The processor system is configured to generate a radio link failure (RLF) report based on detection of a master cell group (MCG) fast recovery failure. The RLF report includes MCG failure information, MCG recovery failure information, or a combination thereof. The processor system is further configured to initiate transmission of the RLF report to a secondary cell group (SCG).

In an additional aspect of the disclosure, a method for wireless communication includes determining, by a user equipment (UE) configured for dual connectivity (DC), a bearer type of the UE. The method further includes transmitting, from the UE, an uplink (UL) delay measurement based on the bearer type.

In an additional aspect of the disclosure, an apparatus for wireless communication including means for determining, by a user equipment (UE) configured for dual connectivity (DC), a bearer type of the UE. The apparatus also includes means for transmitting, from the UE, an uplink (UL) delay measurement based on the bearer type.

In an additional aspect of the disclosure, a non-transitory computer-readable medium having program code recorded thereon. The program code includes code to determine a bearer type of a user equipment (UE) configured for dual connectivity (DC), and initiate transmission of an uplink (UL) delay measurement based on the bearer type.

In an additional aspect of the disclosure, an apparatus configured for wireless communication is disclosed. The apparatus includes at least one processor, and a memory coupled to the processor. The processor is configured to determine a bearer type of a user equipment (UE) configured for dual connectivity (DC), and initiate transmission of an uplink (UL) delay measurement based on the bearer type.

In an additional aspect of the disclosure, an apparatus configured for wireless communication is disclosed. The apparatus includes an interface (e.g., a transmitter, a receiver, etc.) configured for wireless communication and a processor system coupled to the interface. The processor system is configured to determine a bearer type of a user equipment (UE) configured for dual connectivity (DC), and initiate transmission of an uplink (UL) delay measurement based on the bearer type.

Other aspects, features, and implementations will become apparent to those of ordinary skill in the art, upon reviewing the following description of specific, examples in conjunction with the accompanying figures. While features may be discussed relative to certain aspects and figures below, all implementations can include one or more of the advantageous features discussed herein. In other words, while one or more examples may be discussed as having certain advantageous features, one or more of such features may also be used in accordance with the various examples. In similar fashion, while exemplary implementations may be discussed below as device, system, or method implementations the exemplary implementations can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 6 is a flow diagram illustrating example blocks executed by a UE according to some aspects.

FIG. 7 is a flow diagram illustrating example blocks executed by a UE according to some aspects.

FIG. 8 is a flow diagram illustrating example blocks executed by a UE according to some aspects.

FIG. 9 is a flow diagram illustrating example blocks executed by a network entity according to some aspects.

Figure 1:
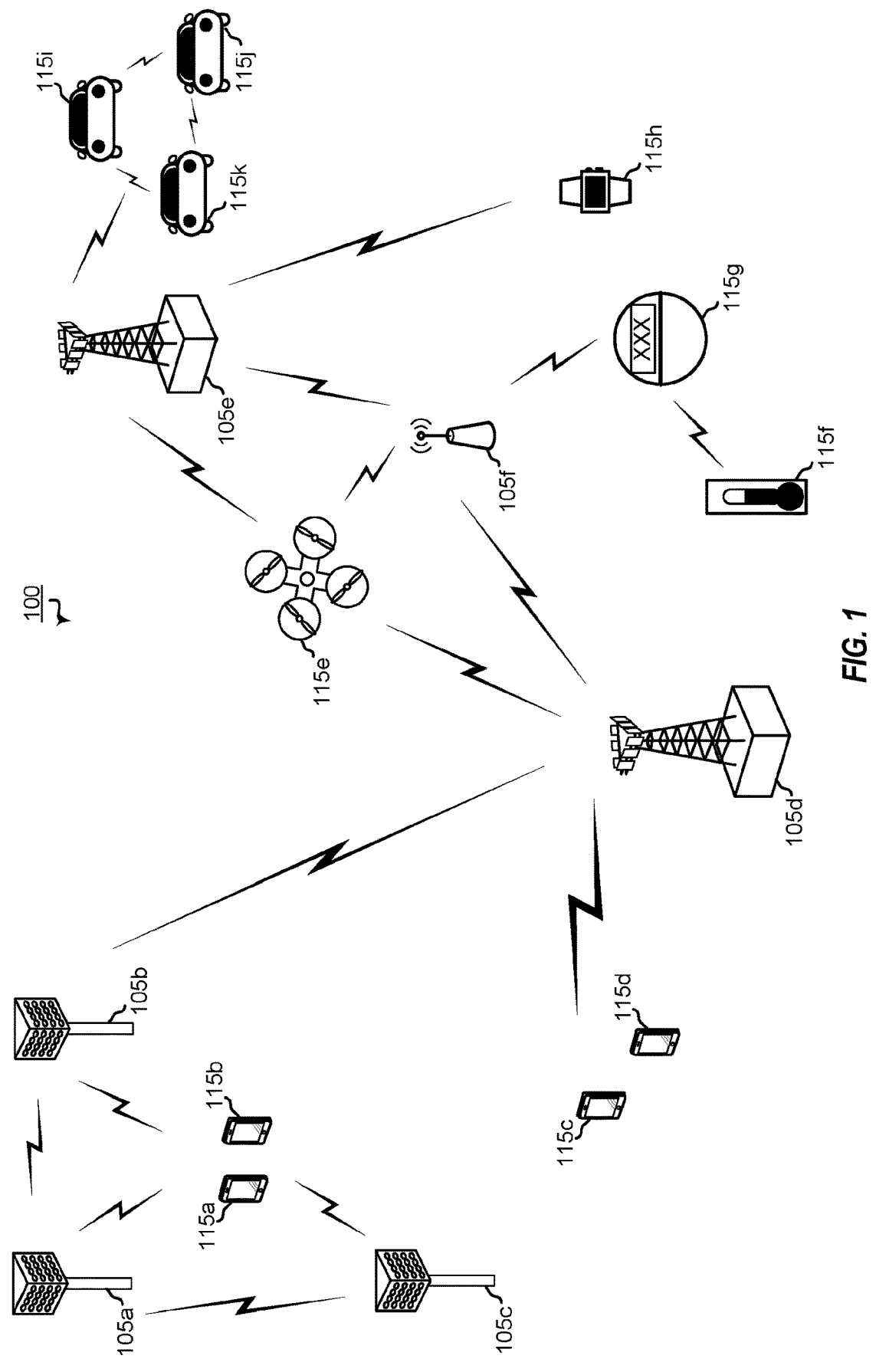
FIG. 1 is a block diagram illustrating details of a wireless communication system according to some aspects.

The Appendix provides further details regarding various aspects of this disclosure and the subject matter therein forms a part of the specification of this application.

DETAILED DESCRIPTION

The detailed description set forth below, in connection with the appended drawings and appendix, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media for radio access network (RAN)-centric data collection for UEs configurable for DC/CA operations. The data collection may be used to improve device (e.g., UE) performance, such as battery life, throughput, latency, reliability, and new radio (NR) functionality and/or features, such as beam management, Bandwidth Part (BWP), RRC_INACTIVE, Multi-Radio Access Technology (RAT) Dual Connectivity (MR-DC), and Dual Connectivity (DC)/Carrier Aggregation (CA). The data collection and operational improvement(s) may also lead to reduced operators' capital expenditure (CAPEX) & operating expenditure (OPEX), e.g., by more accurate base station deployment and operation with less human resource intervention To illustrate, the present disclosure describes collection, storage, reporting, or a combination thereof, of a DC/CA early measurement result in association with a logged minimization of drive test (MDT). As another example, the present disclosure describes a radio link failure (RLF) report configured to support a fast master cell group (MCG) recovery failure via a secondary cell group (SCG). Additionally, the present disclosure also describes a single connectivity Layer 2 (L2) measurement configured to support uplink (UL) delay measurement for a UE configured for dual connectivity (DC) operations.

In some implementations, a UE may be configured for early measurements, such as an early measurements configuration for IDLE/INACTIVE UE to measure camping frequency, non-camping frequency, or a combination thereof. Such early measurements may enable faster DC/CA setup. A UE may be configured to log available early measurement results with one or more MDT results. To illustrate, the UE may log available early measurement results with location information for MDT. The early measurement logging and logged MDT may have the same or different logging intervals (if both early measurement and MDT logging is configured). Early measurement results may be logged when available. If no early measurement result available, such as when the UE is out of validity area or a logging timer expires, a log or entry of the log may be keep blank.

In some implementations, to support early measurements by the UE, a network (NW) may configure the UE for storing, reporting, or a combination thereof, of early measurement results and logged MDT measurement results. To illustrate, the NW can indicate to the UE whether to report logged MDT measurement result, early measurements results, or a combination thereof, in an information request (e.g., UEinformationRequest). In some implementations, the early measurement results and the MDT measurement results may be stored in a single log/file. Alternatively, the early measurement results and the MDT measurement results may be stored in separate logs/files, such as two or more separate log files. When stored as separate log file, the UE may be configured to provide the early measurement results and the MDT measurement results separately or together.

In some implementations, a UE may be configured to generate a RLF report to a support fast MCG recovery failure via an SCG. To illustrate, the UE may be configured to support an MCG fast recovery via an SCG. For example, based on detection of a MCG failure, the UE may not trigger radio resource control (RRC) connection re-establishment. Rather, the UE triggers an MCG failure recovery procedure in which a failure information message is transmitted to the network via the SCG. Based on sending the MCG failure indication, the UE starts a timer and, based on expiration of the timer, the UE initiates RRC connection re-establishment procedure.

The UE may be configured to perform data collection to generate a RLF report in the event of a fast MCG recovery failure via the SCG. For example, the fast MCG recovery failure may occur or be detected based on expiration of a guard timer, a RLF in both the MCG and the SCG, the UE being unable to apply the RRC reconfiguration message as response of sending fast MCG failure info indication. The RLF report may include MCG failure information, MCG recovery failure related information, or a combination thereof. The MCG failure information may include available measurement results of the MCG, a MCG link failure cause, an available measurement results of the SCG, an available measurement results of one or more non-serving cells, or a combination thereof. The MCG recovery failure information may include an available measurement result of the SCG, an available measurement result of the MCG, an available SN configured measurement result, an MCG recovery failure cause (e.g., guard timer expiration indication, SCG link failure detection, etc.), a recovery type (e.g., recovery via split signaling radio bearer (SRB) or Signaling Radio Bearer Type 3 (SRB3)), or a combination thereof.

In some implementations, the UE may be configured to measure uplink (UL) average packet data convergence protocol (PDCP) packet queuing delay measurement (D1) for dual connectivity (DC) operations. For example, when configured as a non-split bearer, the UE may receive a configuration for D1 measurement from a secondary node (SN) or master node (MN). The UE may report the average UL PDCP packet queuing delay to the node (e.g., the SN or the MN) from which the UE received the measurement configuration. As another example, when configured as a slit bearer one PDCP entity and multiple radio link control (RLC) legs, the UE may calculate the UL average PDCP packet queuing delay. To illustrate, in some implementations, the UE may calculate a single D1 value and may not differentiate between PDCP packets delivered to MN or SN. In such implementations, the UE may transmit a report (e.g., a D1 report) to the node from which it received its configuration or to both the MN and the SN. In other implementations, the UE may calculate (e.g., average) the PDCP packets queuing delay separately for the packets delivered to the MN and the SN. In such implementations, the UE may report the two D1 values, along with MN D1 and SN D1 indicators, to the same node from which it received its configuration. Alternatively, the UE may report the two D1 values to MN and SN, respectively—e.g., the MN D1 is reported to the MN and the SN D1 is reported to the SN.

Thus, the present disclosure describes radio access network (RAN)-centric data collection for UEs configurable for DC/CA operations. The data collection may advantageously be used to improve device (e.g., UE) performance, such as battery life, throughput, latency, reliability, and new radio (NR) functionality and/or features, such as beam management, Bandwidth Part (BWP), RRC_INACTIVE, Multi-Radio Access Technology (RAT) Dual Connectivity (MR-DC), and Dual Connectivity (DC)/Carrier Aggregation (CA). The data collection and operational improvement(s) may also lead to reduced operators' capital expenditure (CAPEX) & operating expenditure (OPEX), e.g., by more accurate base station deployment and operation with less human resource intervention This disclosure relates generally to providing or participating in communication as between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may include one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations and/or uses may come about via integrated chip implementations and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some aspects. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may include a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as examples of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115*a*-115*d* of the example(s) illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115*e*-115*k* illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. Backhaul communication between base stations of wireless network 100 may occur using wired and/or wireless communication links.

In operation at wireless network 100, base stations 105*a*-105*c* serve UEs 115*a* and 115*b* using 3D beamforming and coordinated spatial techniques, such as coordinated multi-point (CoMP) or multi-connectivity. Macro base station 105*d* performs backhaul communications with base stations 105*a*-105*c*, as well as small cell, base station 105*f*. Macro base station 105*d* also transmits multicast services which are subscribed to and received by UEs 115*c* and 115*d*. Such multicast services may include mobile television or stream video, or may include other services for providing community information, such as weather emergencies or alerts, such as Amber alerts or gray alerts.

Wireless network 100 may support mission critical communications with ultra-reliable and redundant links for mission critical devices, such UE 115*e*, which is a drone. Redundant communication links with UE 115*e* include from macro base stations 105*d* and 105*e*, as well as small cell base station 105*f*. Other machine type devices, such as UE 115*f* (thermometer), UE 115*g* (smart meter), and UE 115*h* (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
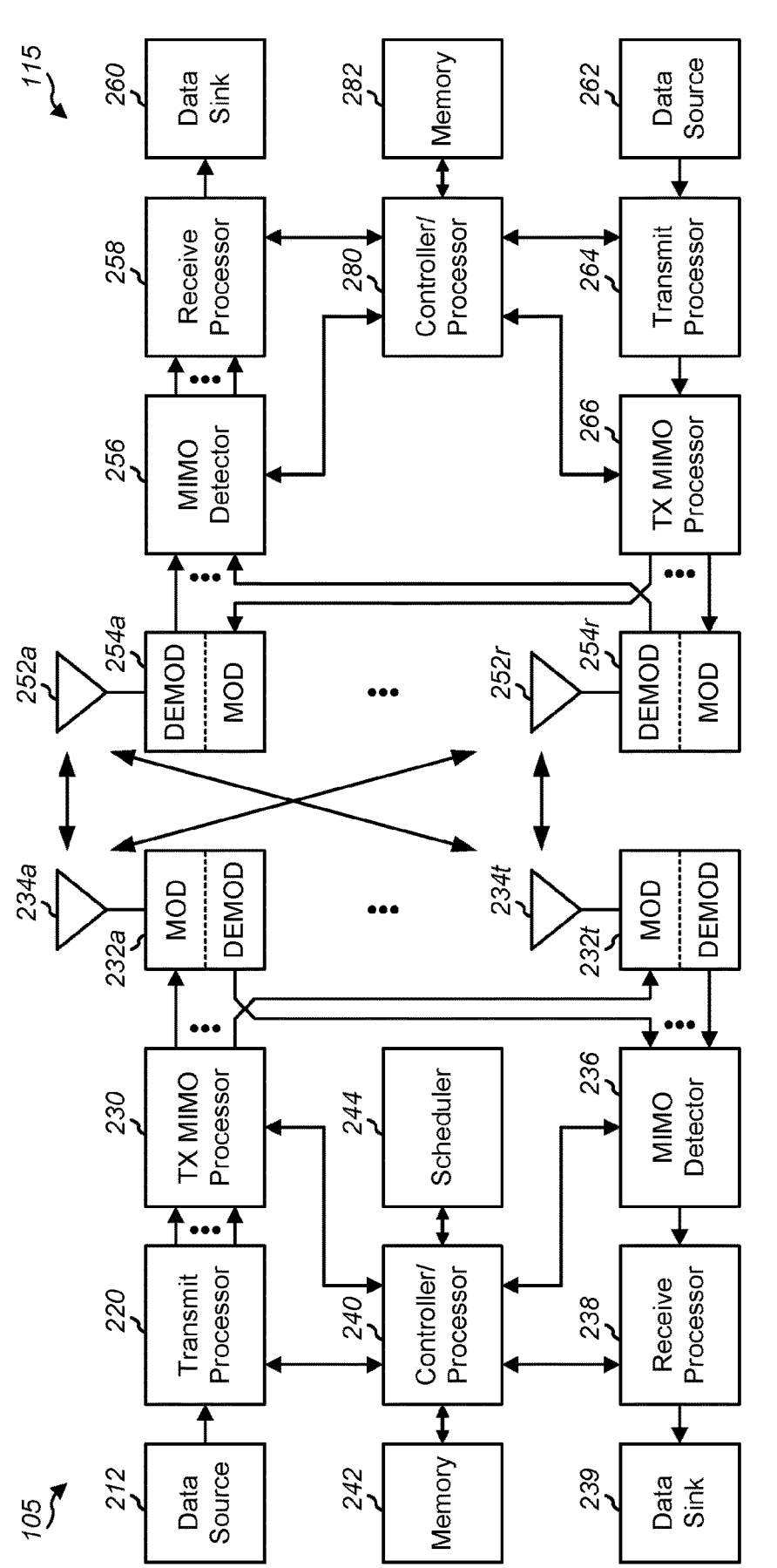
FIG. 2 is a block diagram conceptually illustrating a design of a base station and a user equipment (UE) configured according to some aspects.

FIG. 2 shows a block diagram of a design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type, or another network entity (e.g., a network, a network core, a network core device, etc.). As shown in FIG. 2, base station 105 may be equipped with antennas 234a through 234t, and UE 115 may be equipped with antennas 252a through 252r for facilitating wireless communications.

At the base station 105, a transmit processor 220 may receive data from a data source 212 and control information from a controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DE-MODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal. The symbols from the transmit processor 264 may be precoded by TX MIMO processor 266 if applicable, further processed by the modulators 254a through 254r (e.g., for SC-FDM, etc.), and transmitted to the base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 28 and/or other processors and modules at UE 115 may perform or direct the execution of various processes for the techniques described herein, such as to perform or direct the execution illustrated in FIGS. 6-9, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

In some implementations, UE 115 is configurable for DC operations or DC/CA operations. In such implementations, UE 115 is configured for radio access network (RAN)-centric data collection. To illustrate, UE 115 may be configured for collection, storage, reporting, or a combination thereof, of a DC/CA early measurement result in association with a logged minimization of drive test (MDT). As another example, UE 115 may be configured for data collection to generate a radio link failure (RLF) report configured to support a fast master cell group (MCG) recovery failure via a secondary cell group (SCG). Additionally, or alternatively, UE 115 may be configured for data collection for uplink (UL) delay measurements when UE 115 is configured for dual connectivity (DC) operations.

Figure 3:
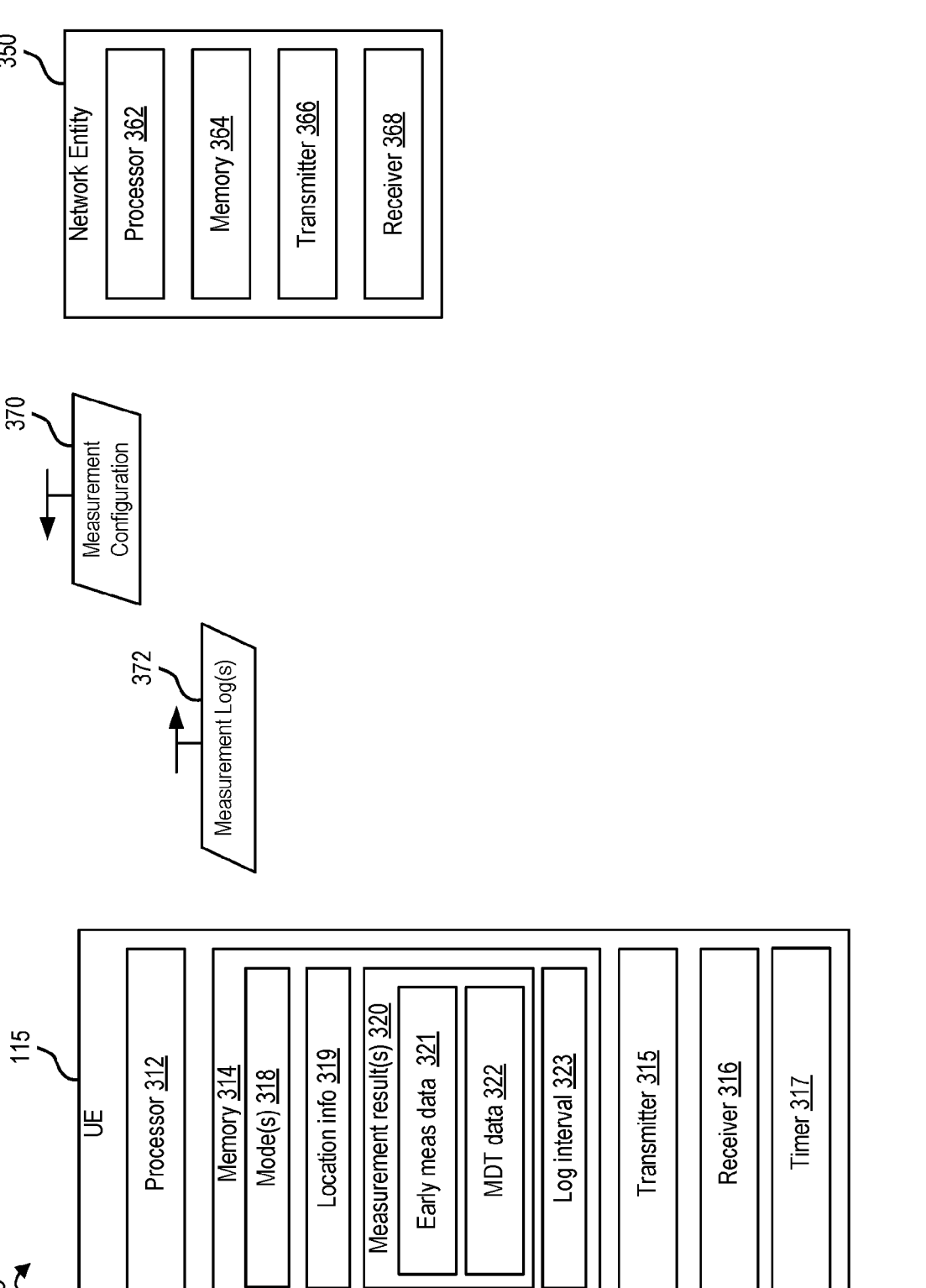
FIG. 3 is a block diagram of an illustrative implementation of a system configured to provide data collection for a user equipment (UE) configurable for dual connectivity (DC)/carrier aggregation (CA) to according to some aspects.

FIG. 3 is a block diagram of an example wireless communications system 300 configured to provide data collection for a user equipment (UE) configurable for dual connectivity/carrier aggregation ((DC/CA). In some examples, wireless communications system 300 may implement aspects of wireless network 100. Wireless communications system 300 includes UE 115 and a network entity 350. Network entity 350 may include or correspond to base station 105, a network, a network core, or another network device, as illustrative, non-limiting examples. Although one UE and one network entity are illustrated, in other implementations, wireless communications system 300 may include more than one UEs, more than one network entity, or both.

UE 115 can include a variety of components (e.g., structural, hardware components) used for carrying out one or more functions described herein. For example, these components can include a processor 312, a memory 314, a transmitter 315, a receiver 316, and a timer 317. Processor 312 may be configured to execute instructions stored at memory 314 to perform the operations described herein. In some implementations, processor 312 includes or corresponds to controller/processor 280, and memory 314 includes or corresponds to memory 282.

Memory 314 may include one or more modes 318, location information 319, one or more measurement results 320, and one or more log intervals 323. Modes 318 may include one or more modes of UE 115, such as an active mode or a non-active mode. The non-active mode may include an idle mode, an inactive mode, a low-power mode, or another mode, as illustrative, non-limiting examples.

Location information 319 may indicate a location of UE 115. For example, location information may include GPS data. The one or more measurement results 320 may include a log of one or more entries. The measurement results 320 may include or indicate early measurement data 321, MDT data 322, or a combination thereof. The early measurement data 321 may include one or more measurements of a camping frequency, a non-camping frequency, or a combination thereof. The MDT data 322 may include one or more MDT results. The one or more log intervals 323 may indicate a first internal for performing measurement(s) to generate early measurement data 321, a second interval for determining MDT data 322, or a combination thereof. In some implementations, the first interval and the second interval are the same interval. Additionally, or alternatively, the first interval and the second interval occur at the same time. In other implementations, the first interval and the second interval are different.

Transmitter 315 is configured to transmit data to one or more other devices, and receiver 316 is configured to receive data from one or more other devices. For example, transmitter 315 may transmit data, and receiver 316 may receive data, via a network, such as a wired network, a wireless network, or a combination thereof. For example, UE 115 may be configured to transmit or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 315 and receiver 316 may be replaced with a transceiver. Additionally, or alternatively, transmitter 315, receiver 316, or both may include or correspond to one or more components of UE 115 described with reference to FIG. 2. Timer 317 may be configured to enable UE 115 to track or determine one or more time periods, or expiration of one or more time periods.

Network entity 350 can include a variety of components (e.g., structural, hardware components) used for carrying out one or more functions described herein. For example, these components can include processor 362, memory 364, transmitter 366, and receiver 368. Processor 362 may be configured to execute instructions stored at memory 364 to perform the operations described herein. In some implementations, processor 362 includes or corresponds to controller/processor 240, and memory 364 includes or corresponds to memory 242.

Transmitter 366 is configured to transmit data to one or more other devices, and receiver 368 is configured to receive data from one or more other devices. For example, transmitter 366 may transmit data, and receiver 368 may receive data, via a network, such as a wired network, a wireless network, or a combination thereof. For example, network entity 350 may be configured to transmit or receive data via a direct device-to-device connection, a LAN, a WAN, a modem-to-modem connection, the Internet, intranet, extranet, cable transmission system, cellular communication network, any combination of the above, or any other communications network now known or later developed within which permits two or more electronic devices to communicate. In some implementations, transmitter 356 and receiver 368 may be replaced with a transceiver. Additionally, or alternatively, transmitter 366, receiver, 368, or both may include or correspond to one or more components of base station 105 described with reference to FIG. 2.

In a particular implementation, wireless communications system 300 includes a 5G network. For example, UE 115 may include 5G UEs (e.g., UEs configured to operate in accordance with a 5G network). Network entity 350 may include a 5G base station (e.g., a base station configured to operate in accordance with a 5G network).

In some implementations, UE 115 may be configured for early measurements, such as an early measurements configuration for IDLE/INACTIVE UE to measure camping frequency, non-camping frequency, or a combination thereof. Such early measurements (e.g., 321) may enable faster DC/CA setup. UE 115 may be configured to log available early measurement results with one or more MDT results (e.g., 322). To illustrate, UE 115 may log available early measurement results with location information (e.g., 319) for MDT. The early measurement logging and logged MDT may have the same or different logging intervals (e.g., 323)—if both early measurement and MDT logging is configured. Early measurement results (e.g., 321) may be logged when available. If no early measurement result available, such as when UE 115 is out of validity area or a logging timer expires, a log or entry of the log may be keep blank.

In some implementations, to support early measurements by UE 115, a network (NW), such as network entity 350, may configure UE 115 for storing, reporting, or a combination thereof, of early measurement results (e.g., 321) and logged MDT measurement results (e.g., 322). To illustrate, the NW can indicate to UE whether to report logged MDT measurement result, early measurements results, or a combination thereof, in a measurement configuration 370. For example, measurement configuration 370 may include an information request, such as an UEinformationRequest. In some implementations, the early measurement results (e.g., 321) and the MDT measurement results (e.g., 322) may be stored in a single log/file. Alternatively, the early measurement results (e.g., 321) and the MDT measurement (e.g., 322) results may be stored in separate logs/files, such as two or more separate log files. When stored as separate log file, UE 115 may be configured to provide the early measurement results and the MDT measurement results separately or together.

During operation of wireless communications system 300, UE 115 receives measurement configuration 370 from network entity 350. The measurement configuration 370 may include a storage configuration, a reporting configuration, or a combination thereof. The storage configuration may indicate to store the minimization of drive test (MDT) result in a first log file, an interval of measuring the MDT measurements, the early measurement result in a second log file, an interval for measuring the early measurement results, whether to store MDT results and early measurement results in the same log, or a combination thereof. The reporting configuration may indicate transmit the MDT result and the early measurement result in the same report message or in separate report messages.

UE 115 may identify the storage configuration, the reporting configuration, or both, based on the measurement configuration 370. UE 115 may generate or populate measurement results 320 based on the storage configuration. For example, UE 115 may generate or populate measurement results 320 while UE 115 is in a non-active state. To illustrate, UE 115 may determine a minimization of drive test (MDT) result, an early measurement result, or both. The early measurement data 321 may be determined according to a first interval (e.g., 323) and the MDT data 322 may be determined according to a second interval (e.g., 323). UE 115 may generate a first log of one or more MDT result entries, and a second log of one or more early measurement result entries. In some implementations, UE 115 may also generate or populate location information 319.

UE 115 may transmit one or more measurement logs 372 (e.g, a report) that includes the MDT data 322, the early measurement data 321, or a combination thereof. UE 115 may generate the one or more measurement logs 372 (e.g., the report) based on the reporting configuration. In some implementations, UE 115 may transmit a first report including the MDT data 322 and a second report including the early measurement data 321. The first report may be transmitted before, after, or concurrent with the second report.

Thus, the present disclosure describes radio access network (RAN)-centric data collection for UEs configurable for DC/CA operations. For example, the operations described herein provide collection, storage, reporting, or a combination thereof, of a DC/CA early measurement result in association with a logged minimization of drive test (MDT). The data collection may advantageously be used to improve device (e.g., UE) performance, such as battery life, throughput, latency, reliability, and new radio (NR) functionality and/or features.

Figure 4:
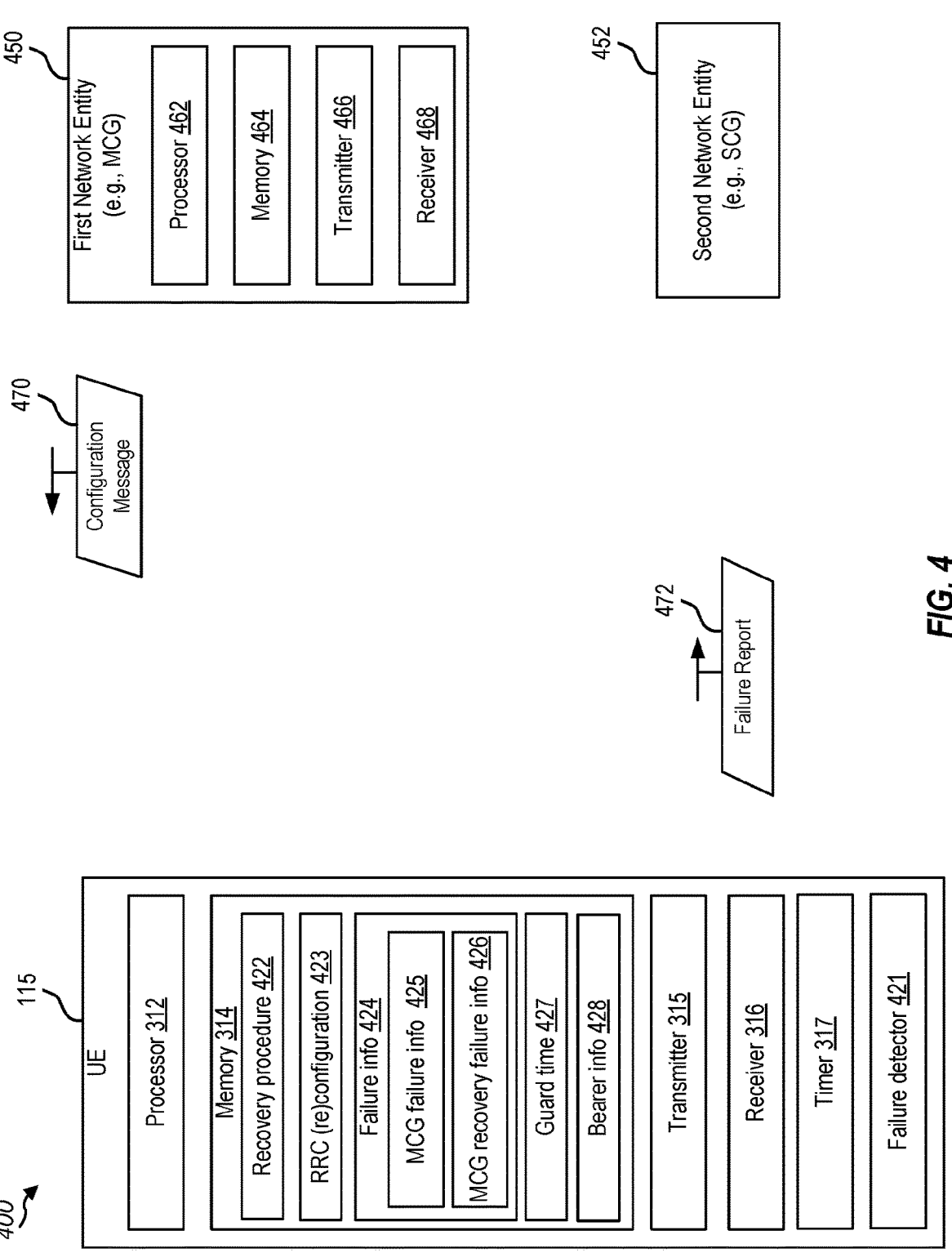
FIG. 4 is a block diagram of another illustrative implementation of a system configured to provide data collection for a UE configurable for dual connectivity (DC)/carrier aggregation (CA) to according to some aspects.

FIG. 4 is a block diagram of an example wireless communications system 400 configured to provide data collection for a user equipment (UE) configurable for DC/CA. In some examples, wireless communications system 400 may implement aspects of wireless network 100 or wireless communications system 300. Wireless communications system 400 includes UE 115 and a first network entity 450 and a second network entity 452. Network entity 450, 452 may include or correspond to base station 105, a network, a network core, or another network device, as illustrative, non-limiting examples. In some implementations, first network entity 450 includes or corresponds to a master cell group (MCG), and second network entity 452 includes or corresponds to a secondary cell group (SCG). Although one UE and two network entities are illustrated, in other implementations, wireless communications system 400 may include more than one UEs, one network entity or more than two network entities, or both.

UE 115 can include a variety of components (e.g., structural, hardware components) used for carrying out one or more functions described herein. For example, these components can include a processor 312, a memory 314, a transmitter 315, a receiver 316, a timer 317, and a failure detector 421. Processor 312 may be configured to execute instructions stored at memory 314 to perform the operations described herein. In some implementations, processor 312 includes or corresponds to controller/processor 280, and memory 314 includes or corresponds to memory 282.

Memory 314 may include a recovery procedure 422, RRC configuration(s) or (re)configuration(s) 423, failure information 424, a guard time 427, and bearer information 428. Recovery procedure 422 may include information or instruction to be performed by UE 115 responsive to detection of a radio link failure. For example, the recovery procedure 422 may include or correspond to a fast MCG recovery. RRC configuration(s) 423 may include one or more RRC configurations received from the network, such as first network entity 450 or second network entity 452. In some implementations, at least one RRC configuration(s) may be received via configuration message 470.

Failure information 424 may be generated by failure detector 421. The failure information 424 may include MCG failure information 425 and MCG recovery failure information 426. The MCG failure information 425 may include an available measurement result of the MCG, a MCG link failure cause, an available measurement result of the SCG, an available measurement result of a non-serving cell, or a combination thereof. The MCG recovery failure information 426 may include an available measurement result of the SCG, an available measurement result of the MCG, an available secondary node (SN) measurement result, or a combination thereof. Additionally, or alternatively, the MCG recovery failure information 426 may include an MCG recovery failure cause, such a guard timer expiration indication or a SCG link failure detection, a signaling radio bearer type (e.g., a split SRB or a SRB type 3 (SRB3)), or a combination thereof.

Guard time 427 may indicate a guard time for performing or completing a fast MCG recovery procedure. Bearer information 428 may include or indicate a bearer type of UE 115, such as split signaling radio bearer (SRB) or Signaling Radio Bearer Type 3 (SRB3).

Transmitter 315 is configured to transmit data to one or more other devices, and receiver 316 is configured to receive data from one or more other devices. For example, transmitter 315 may transmit data, and receiver 316 may receive data, via a network, such as a wired network, a wireless network, or a combination thereof. For example, UE 115 may be configured to transmit or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 315 and receiver 316 may be replaced with a transceiver. Additionally, or alternatively, transmitter 315, receiver 316, or both may include or correspond to one or more components of UE 115 described with reference to FIG. 2.

Timer 317 may be configured to enable UE 115 to track or determine one or more time periods, or expiration of one or more time periods. Failure detector 421 may be configured to detect or determine a radio link failure, such as a radio link failure between UE 115 and first network entity 450, or between UE 115 and second network entity 452.

First network entity 450 can include a variety of components (e.g., structural, hardware components) used for carrying out one or more functions described herein. For example, these components can include processor 362, memory 364, transmitter 366, and receiver 368. Processor 362 may be configured to execute instructions stored at memory 364 to perform the operations described herein. In some implementations, processor 362 includes or corresponds to controller/processor 240, and memory 364 includes or corresponds to memory 242.

Transmitter 366 is configured to transmit data to one or more other devices, and receiver 368 is configured to receive data from one or more other devices. For example, transmitter 366 may transmit data, and receiver 368 may receive data, via a network, such as a wired network, a wireless network, or a combination thereof. For example, first network entity 450 may be configured to transmit or receive data via a direct device-to-device connection, a LAN, a WAN, a modem-to-modem connection, the Internet, intranet, extranet, cable transmission system, cellular communication network, any combination of the above, or any other communications network now known or later developed within which permits two or more electronic devices to communicate. In some implementations, transmitter 356 and receiver 368 may be replaced with a transceiver. Additionally, or alternatively, transmitter 366, receiver, 368, or both may include or correspond to one or more components of base station 105 described with reference to FIG. 2.

Second network entity 452 may also include one or more components, such as processors, memories, transmitters, receivers, etc., which are not shown for convenience. Second network entity 452 may include one or more components as described with reference to second network entity 450. In some implementations, first network entity 450 and second network entity 452 are included in or correspond to the same device.

In a particular implementation, wireless communications system 400 includes a 5G network. For example, UE 115 may include 5G UEs (e.g., UEs configured to operate in accordance with a 5G network). Network entities 450, 452 may include a 5G base station (e.g., a base station configured to operate in accordance with a 5G network).

In some implementations, UE 115 may be configured to generate a RLF report (e.g., 472) to a support fast MCG recovery failure via an SCG (e.g., 452). For example, based on detection of a MCG failure by failure detector 421, UE 115 may not trigger radio resource control (RRC) connection re-establishment. Rather, UE 115 may trigger an MCG failure recovery procedure (E.g., 422) in which a failure information message is transmitted to the network via the SCG (e.g., 452). Based on sending the MCG failure indication, UE 115 starts timer 317 and, based on expiration of a time period, UE 115 may initiate a RRC connection re-establishment procedure (e.g., 422).

In some implementations, UE 155 may be configured to perform data collection to generate RLF report (e.g, 472) in the event of a fast MCG recovery failure via the SCG (e.g., 452). For example, the fast MCG recovery failure may occur or be detected based on expiration of a guard timer, a RLF in both the MCG and the SCG, or UE 115 being unable to apply the RRC reconfiguration message responsive to sending fast MCG failure info indication. The RLF report (e.g., 472) may include MCG failure information 425, MCG recovery failure related information 426, or a combination thereof. The MCG failure information 425 may include available measurement results of the MCG, a MCG link failure cause, an available measurement results of the SCG, an available measurement results of one or more non-serving cells, or a combination thereof. The MCG recovery failure information 426 may include an available measurement result of the SCG, an available measurement result of the MCG, an available SN configured measurement result, an MCG recovery failure cause (e.g., guard timer expiration indication, SCG link failure detection, etc.), a recovery type (e.g., recovery via split signaling radio bearer (SRB) or Signaling Radio Bearer Type 3 (SRB3)), or a combination thereof.

During operation of wireless communications system 400, UE 115 may detect a radio link failure and may perform a fast MCG recovery procedure. As part of the MCG recovery, UE 115 may receive a configuration message 470 from first network entity 450 or second network entity 452. Configuration message may include a RRC configuration. UE 115 may detect a failure of the fast MCG recovery procedure.

Based on detection of the fast MCG recovery failure, UE 115 may generate and send failure report 472. UE 115 may perform one or more operations to recover the MCG connection, to recover an SCG connection, or both.

Thus, the present disclosure describes radio access network (RAN)-centric data collection for UEs configurable for DC/CA operations. For example, the operations described herein provide a radio link failure (RLF) report configured to support a fast master cell group (MCG) recovery failure via a secondary cell group (SCG). The data collection may advantageously be used to improve device (e.g., UE) performance, such as battery life, throughput, latency, reliability, and new radio (NR) functionality and/or features.

Figure 5:
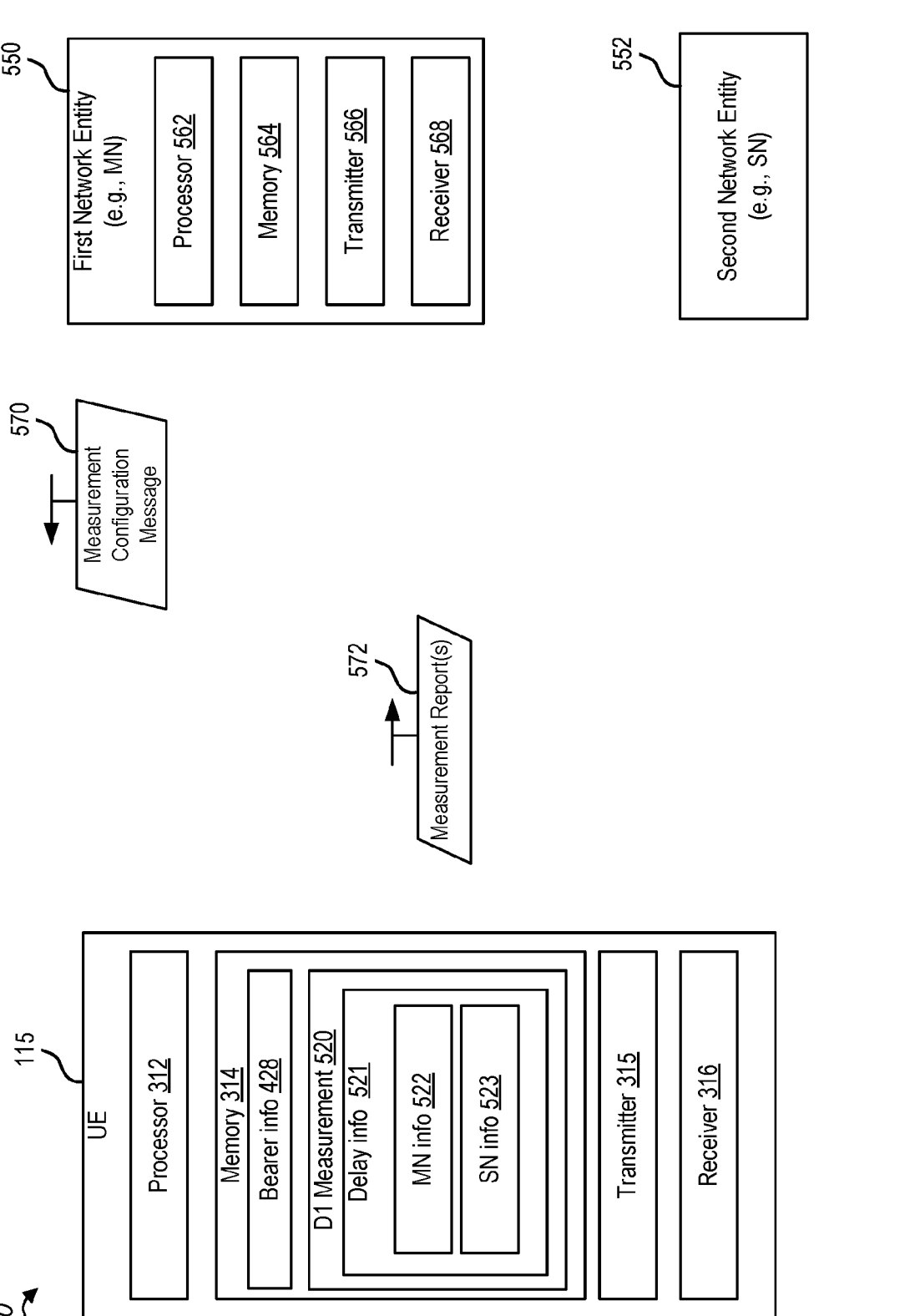
FIG. 5 is a block diagram of another illustrative implementation of a system configured to provide data collection for a UE configurable for dual connectivity (DC)/carrier aggregation (CA) to according to some aspects.

FIG. 5 is a block diagram of an example wireless communications system 500 configured to provide data collection for a user equipment (TIE) configurable for dual connectivity (DC)/carrier aggregation (CA). In some examples, wireless communications system 500 may implement aspects of wireless network 100 or wireless communications system 300, 400. Wireless communications system 500 includes UE 115 and a first network entity 550 and a second network entity 552. Network entity 550, 552 may include or correspond to base station 105, a network, a network core, or another network device, as illustrative, non-limiting examples. In some implementations, first network entity 550 includes or corresponds to a master node (MN), and second network entity 552 includes or corresponds to a secondary node (SN). Although one UE and two network entities are illustrated, in other implementations, wireless communications system 500 may include more than one UEs, one network entity or more than two network entities, or both.

UE 115 can include a variety of components (e.g., structural, hardware components) used for carrying out one or more functions described herein. For example, these components can include a processor 312, a memory 314, a transmitter 315, and a receiver 316. Processor 312 may be configured to execute instructions stored at memory 314 to perform the operations described herein. In some implementations, processor 312 includes or corresponds to controller/processor 280, and memory 314 includes or corresponds to memory 282.

Memory 314 may include bearer information 428 and one or more D1 measurements 520. The one or more D1 measurements 520 may include delay information 521, such as MN information 522, SN information 523, or a combination thereof. The delay information 521 may include a UL average packet data convergence protocol (PDCP) packet queuing delay measurement (D1). MN information 522 includes an average the PDCP packets queuing delay for the packets delivered to the first network entity 550. SN information 523 includes an average the PDCP packets queuing delay for the packets delivered to the second network entity 552. In some implementations, delay information 521 may include an average of PDCP packets queuing delay for packets delivered to the first and second network entities 550, 552.

Transmitter 315 is configured to transmit data to one or more other devices, and receiver 316 is configured to receive data from one or more other devices. For example, transmitter 315 may transmit data, and receiver 316 may receive data, via a network, such as a wired network, a wireless network, or a combination thereof. For example, UE 115 may be configured to transmit or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 315 and receiver 316 may be replaced with a transceiver. Additionally, or alternatively, transmitter 315, receiver 316, or both may include or correspond to one or more components of UE 115 described with reference to FIG. 2.

First network entity 550 can include a variety of components (e.g., structural, hardware components) used for carrying out one or more functions described herein. For example, these components can include processor 362, memory 364, transmitter 366, and receiver 368. Processor 362 may be configured to execute instructions stored at memory 364 to perform the operations described herein. In some implementations, processor 362 includes or corresponds to controller/processor 240, and memory 364 includes or corresponds to memory 242.

Transmitter 366 is configured to transmit data to one or more other devices, and receiver 368 is configured to receive data from one or more other devices. For example, transmitter 366 may transmit data, and receiver 368 may receive data, via a network, such as a wired network, a wireless network, or a combination thereof. For example, first network entity 550 may be configured to transmit or receive data via a direct device-to-device connection, a LAN, a WAN, a modem-to-modem connection, the Internet, intranet, extranet, cable transmission system, cellular communication network, any combination of the above, or any other communications network now known or later developed within which permits two or more electronic devices to communicate. In some implementations, transmitter 356 and receiver 368 may be replaced with a transceiver. Additionally, or alternatively, transmitter 366, receiver, 368, or both may include or correspond to one or more components of base station 105 described with reference to FIG. 2.

Second network entity 552 may also include one or more components, such as processors, memories, transmitters, receivers, etc., which are not shown for convenience. Second network entity 552 may include one or more components as described with reference to second network entity 550. In some implementations, first network entity 550 and second network entity 552 are included in or correspond to the same device.

In a particular implementation, wireless communications system 500 includes a 5G network. For example, UE 115 may include 5G UEs (e.g., UEs configured to operate in accordance with a 5G network). Network entities 550, 552 may include a 5G base station (e.g., a base station configured to operate in accordance with a 5G network).

In some implementations, UE 115 may be configured to measure uplink (UL) average packet data convergence protocol (PDCP) packet queuing delay measurement (D1) (e.g., 521) for dual connectivity (DC) operations. For example, when configured as a non-split bearer, UE 115 may receive a configuration (e.g., 570) for D1 measurement from a secondary node (SN) (e.g., 552) or master node (MN) (e.g., 550). UE 115 may report the average UL PDCP packet queuing delay to the node (e.g., the SN or the MN) from which UE 115 received the measurement configuration (e.g., 570). As another example, when configured as a slit bearer one PDCP entity and multiple radio link control (RLC) legs, UE 115 may calculate the UL average PDCP packet queuing delay. To illustrate, in some implementations, UE 115 may calculate a single D1 value and may not differentiate between PDCP packets delivered to MN (e.g., 550) or SN (e.g., 552). In such implementations, UE 115 may transmit a report 572 (e.g., a D1 report) to the node from which UE 115 received UE configuration (e.g., 570) or to both the MN (e.g., 550) and the SN (e.g., 552). In other implementations, UE 115 may calculate (e.g., average) the PDCP packets queuing delay separately for the packets delivered to the MN and the SN. In such implementations, UE 115 may report two D1 values, along with MN D1 and SN D1 indicators, to the same node from which UE 115 received its configuration. Alternatively, UE 115 may report the two D1 values to MN and SN, respectively—e.g., the MN D1 is reported to the MN and the SN D1 is reported to the SN.

During operation of wireless communications system 400, UE 115 determines a bearer type of UE 115. For example UE 115 may determine the bearer type based on bearer information 428. The bearer type may include a non-split bearer type or a split bearer type.

UE 115 may perform one or more Layer 2 measurements. Based on the one or more Layer 2 measurements, UE 115 may generate the UL delay measurement 520. The UL delay measurement 520 may include or correspond to D1 measurement 520, delay information 521, MN information 522, SN information, or a combination thereof.

UE 115 may transmit an uplink (UL) delay measurement based on the bearer type. In some implementations, transmitting the UL delay measurement includes transmitting one or more measurement reports, such as one or more measurement reports 572.

In some implementations, method 800 may include, when UE 115 (e.g., bearer type) includes a non-split bearer, the UL delay measurement is transmitted to the SN or the MN from which UE 115 received configuration message (e.g., 570).

In other implementations, when UE 115 (e.g., bearer type) includes a split bearer with one PDCP entity and multiple RLC legs, UE 115 determines the UL delay measurement for the MN and the SN. For example, the UL delay measurement may be a single value. In such implementations, UL delay measurement is transmitted to the SN or the MN from which the UE 115 received the configuration message (e.g., 570). Alternatively, the UL delay measurement may be transmitted to both the SN and the MN.

In other implementations, when UE 115 includes a split bearer with one PDCP entity and multiple RLC legs, UE 115 may calculate a first UL delay measurement for the MN and calculate a second UL delay measurement for the SN. In some implementations, UE 115 may transmit the first UL delay measurement, a MN indicator corresponding to the first UL delay measurement, the second UL delay measurement, a SN indicator corresponding to the second UL delay measurement, or a combination thereof, to the SN or the MN from which the UE received the configuration message. In other implementations, transmitting the UL delay measurement includes transmitting the first UL delay measurement to the MN, and transmitting the second UL delay measurement to the SN.

Thus, the present disclosure describes radio access network (RAN)-centric data collection for UEs configurable for DC/CA operations. For example, the operations described herein provide a Layer 2 (L2) measurement configured to support uplink (UL) delay measurement for a UE configured for dual connectivity (DC) operations. The data collection may advantageously be used to improve device (e.g., UE) performance, such as battery life, throughput, latency, reliability, and new radio (NR) functionality and/or features.

Figure 10:
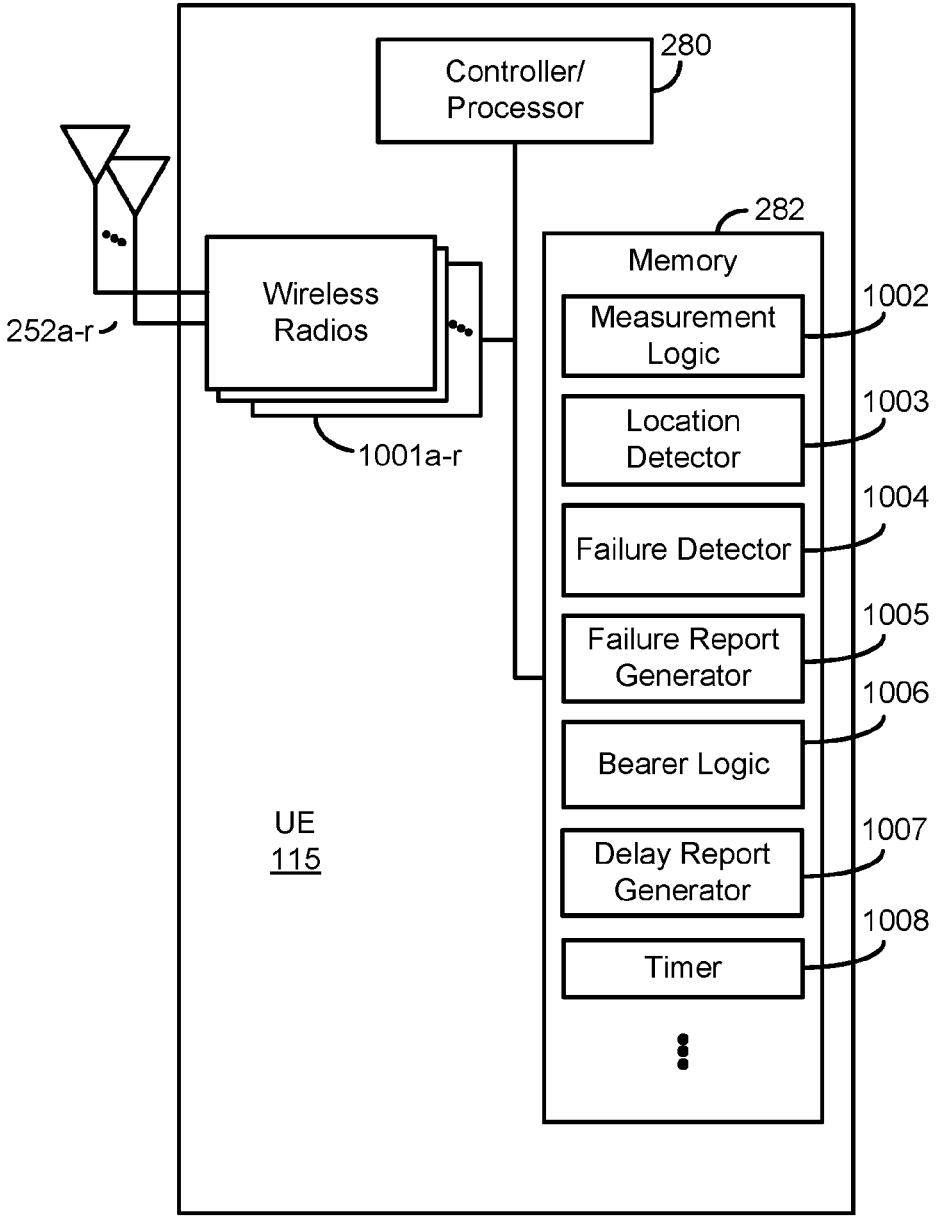
FIG. 10 is a block diagram conceptually illustrating a design of a UE configured according to some aspects.

FIGS. 6-8 are flow diagrams illustrating example methods performed by a UE for communication. For example, example blocks of the methods may cause the UE to perform data collection associated with dual connectivity (DC)/ carrier aggregation (CA) operations according to some aspects of the present disclosure. The example blocks will also be described with respect to UE 115 as illustrated in FIG. 10. FIG. 10 is a block diagram conceptually illustrating an example design of a UE configured to perform data collection associated with dual connectivity (DC)/carrier aggregation (CA) operations according to one aspect of the present disclosure. UE 115 includes the structure, hardware, and components as illustrated for UE 115 of FIG. 2 or 3-5. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1001*a-r* and antennas 252*a-r*. Wireless radios 1001*a-r* includes various components and hardware, as illustrated in FIG. 2 for UE 115, including modulator/demodulators 254*a-r*, MIMO detector 256, receive processor 258, transmit processor 264, and TX MIMO processor 266.

Figure 11:
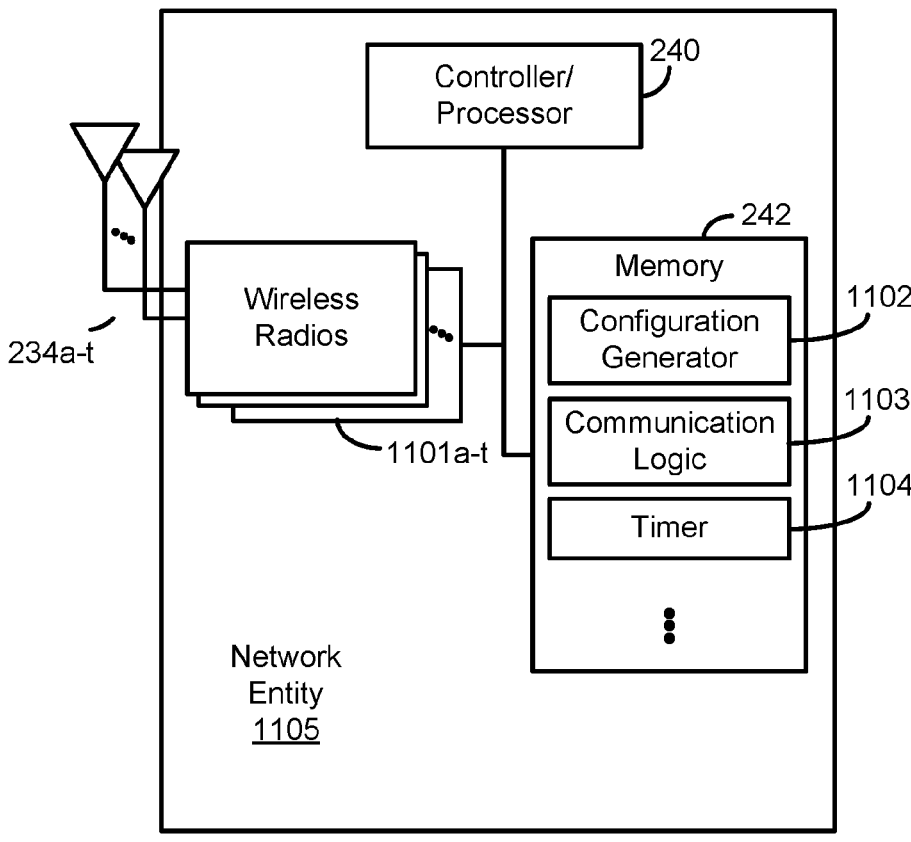
FIG. 11 is a block diagram conceptually illustrating a design of a network entity configured according to some aspects.

As shown, memory 282 may include measurement logic 1002, location detector 1003 (e.g., a global positioning system (GPS)), a failure detector 1004, a failure report generator 10005, bearer logic 1006, a delay report generator 1007, and a timer 1008. Measurement logic 1002 may be configured to monitor or measure data and to generate or calculate measured data (e.g., result data). For example, the data monitored, measured, generated, or calculated by measurement logic 1002 may include or correspond to measurement results 320, early measurement data 321, MDT data 322, measurement log(s) 372, failure information 424, MCG failure information 425, MCG recovery failure information 426, failure report 472, D1 measurement(s) 520, delay information 521, MN information 522, SN information 523, or a combination thereof. Additionally, or alternatively, measurement logic 1002 may be configured to generate one or more message or one or more reports, such as measurement log(s) 372 or measurement report(s) 572. Location detector 1003 (e.g., a global positioning system (GPS)) and may be configured to determine, receive, or identify location information 319. Failure detector 1004 may be configured to detect a communication link failure In some implementations, failure detector 1004 is configured to generate failure data, such as failure information 424, MCG failure information 425, MCG recovery failure information 426, failure report 472. Failure report generator 10005 may be configured to generate a failure report, such as failure report 472. Bearer logic 1006 may be configured to perform one or more operations according to bearer information, such as bearer information 428. Delay report generator 1007 may be configured to generate one or more delay reports, such as measurement report(s) 572. Timer 1008 may include or correspond to time 317. In some aspects, measurement logic 1002, location detector 1003 (e.g., a global positioning system (GPS)), a failure detector 1004, a failure report generator 10005, bearer logic 10006, a delay report generator 1007, a timer 1008, or a combination thereof, may include or correspond to processor(s) 302. UE 115 may receive signals from and/or transmit signal to a one or more network entities, such as base station 105, network entity 350, 450, 452, 550, 552, a core network, a core network device, or a network entity as illustrated in FIG. 11.

Referring to FIGS. 6, a sample flow diagram of method 600 of UE operations for communication is shown. In some implementations, method 600 may be performed by UE 115. In other implementations, method 600 may be performed by an apparatus configured for wireless communication. For example, the apparatus may include at least one processor, and a memory coupled to the processor. The processor may be configured to perform operations of method 600. In other implementations, method 600 may be performed or executed using a non-transitory computer-readable medium having program code recorded thereon. The program code may be program code executable by a computer for causing the computer to perform operations of method 600.

As illustrated at block 602, a UE determines a minimization of drive test (MDT) result. The MDT result may include or correspond to MDT data 322. For example, UE 115 may determine the MDT result using measurement logic 1002.

At 604, UE determines an early measurement result. The early measurement result may include or correspond to early measurement data 321. The early measurement result may include a dual connectivity/carrier aggregation (DC/CA) early measurement result, may be determined while the UE is in a non-active state (e.g., an idle state, a low power state, or an inactive state), or a combination thereof. Additionally, or alternatively, the early measurement result may include a camping frequency measurement, a non-camping frequency measurement, or a combination thereof. For example, UE 115 may determine early measurement result using measurement logic 1002.

At 606, the UE transmits a report including the MDT result, the early measurement result, or a combination thereof. The report may include or correspond to measurement log(s) 372. The report may be generated using measurement logic 1002. In some implementations, the UE may receive, from a network entity, an information request for one or more MDT results, one or more early measurement results, or a combination thereof. The network element may include or correspond to base station 105, network entity 350, 450, 452, 550, 552, 1105, a network device, or a network core, as illustrative, non-limiting examples. In such implementations, the UE may transmit the report responsive to the information request. UE 115 may transmit the report using wireless radios 1001a-r and antennas 252a-r.

In some implementations, the method 600 includes UE determining location information associated with a MDT. The location information may include or correspond to location information 319. For example, UE 115 may use location detector 1003 to determine the location information. In some such implementations, method 600 further includes the UE storing the early measurement result with the location information.

In some implementations, early measurement result information is determined according to a first interval, the MDT result information is determined according to a second interval, or a combination thereof. The first interval and the second internal may include or correspond to log internal 323. The first interval and the second interval may be the same interval, or may be different intervals. UE 115 may use timer 1008 to determine expiration of a time period corresponding to the first interval or the second interval.

In some implementations, method 600 may include the UE generating a first log of one or more MDT result entries, generating a second log of one or more early measurement result entries, or a combination thereof. The first log and the second log may include or correspond to measurement result(s) 320. In some implementations, the UE may generate a blank early measurement result entry when an early measurement result is unavailable. UE 115 may generate the first log, the second log, or a combination thereof, using measurement logic 1002.

In some implementations, method 600 may include receiving, by the UE from a network element, a measurement configuration message. The network element may include or correspond to base station 105, network entity 350, 450, 452, 550, 552, 1105, a network device, or a network core, as illustrative, non-limiting examples. The measurement configuration message may include or correspond to measurement configuration 370. The measurement configuration message may include a storage configuration, reporting configuration, or a combination. UE 115 may receive the measurement configuration report using wireless radios 1001a-r and antennas 252a-r. In some such implementations, method 600 further includes storing, by the UE based on the measurement configuration message, the MDT result and the early measurement result in the same log file. Alternatively, method 600 may include storing, by the UE based on the measurement configuration message, the MDT result in a first log file and the early measurement result in a second log file. In some such implementations, transmitting the report includes transmitting a first report including the MDT result, transmitting a second report including the early measurement result, or a combination thereof.

Thus, method 600 enables radio access network (RAN)-centric data collection for UEs configurable for DC/CA operations. For example, the operations described herein provide collection, storage, reporting, or a combination thereof, of a DC/CA early measurement result in association with a logged minimization of drive test (MDT). The data collection may advantageously be used to improve device (e.g., UE) performance, such as battery life, throughput, latency, reliability, and new radio (NR) functionality and/or features.

Referring to FIGS. 7, a sample flow diagram of method 700 of UE operations for communication is shown. In some implementations, method 700 may be performed by UE 115. In other implementations, method 700 may be performed by an apparatus configured for wireless communication. For example, the apparatus may include at least one processor, and a memory coupled to the processor. The processor may be configured to perform operations of method 700. In other implementations, method 700 may be performed or executed using a non-transitory computer-readable medium having program code recorded thereon. The program code may be program code executable by a computer for causing the computer to perform operations of method 700.

As illustrated at block 702, a UE generates a radio link failure (RLF) report based on detection of a master cell group (MCG) fast recovery failure. The RLF report may include or correspond to failure report 472. The RLF report may include MCG failure information, MCG recovery failure information, or a combination thereof. The MCG failure information and the MCG recovery failure information may include or correspond to MCG failure information 425 and MCG recovery failure information 426, respectively. UE 115 may generate the RLF report using measurement logic 1002, failure detector 1004, failure report generator 1005, or a combination thereof. In some implementations, the UE is a dual connectivity/carrier aggregation (DC/CA) configuration.

In some implementations, the MCG failure information includes an available measurement result of the MCG, a MCG link failure cause, an available measurement result of the SCG, an available measurement result of a non-serving cell, or a combination thereof. Additionally, or alternatively, the MCG recovery failure information includes an available measurement result of the SCG, an available measurement result of the MCG, an available secondary node (SN) measurement result, or a combination thereof. The MCG recovery failure information may include an MCG recovery failure cause, such as a guard timer expiration indication or a SCG link failure detection, as illustrative, non-limiting examples. Additionally, or alternatively, the MCG recovery failure information may include a signaling radio bearer type, such as a split SRB or a SRB type 3 (SRB3), as illustrative, non-limiting examples.

At 704, method 700 further includes the UE transmitting the RLF report to a secondary cell group (SCG). The SCG may include or correspond to a network entity, such as base station 105, network entity 350, 450, 452, 550, 552, 1105, a network device, or a network core, as illustrative, non-limiting examples. UE 115 may transmit the RLF report using wireless radios 1001a-r and antennas 252a-r.

In some implementations, method 700 further include detecting the fast MCG recovery failure. The fast MCG recovery failure may be detected based on expiration of a guard time, RLFs for both the MCG and SCG, or failure to apply a radio resource control (RRC) reconfiguration message.

Thus, method 700 enables radio access network (RAN)-centric data collection for UEs configurable for DC/CA operations. For example, the operations described herein provide a radio link failure (RLF) report configured to support a fast master cell group (MCG) recovery failure via a secondary cell group (SCG). The data collection may advantageously be used to improve device (e.g., UE) performance, such as battery life, throughput, latency, reliability, and new radio (NR) functionality and/or features.

Referring to FIGS. 8, a sample flow diagram of method 800 of UE operations for communication is shown. In some implementations, method 800 may be performed by UE 115. In other implementations, method 800 may be performed by an apparatus configured for wireless communication. For example, the apparatus may include at least one processor, and a memory coupled to the processor. The processor may be configured to perform operations of method 800. In other implementations, method 800 may be performed or executed using a non-transitory computer-readable medium having program code recorded thereon. The program code may be program code executable by a computer for causing the computer to perform operations of method 800.

As illustrated at block 802, method 800 includes determining, by a user equipment (UE) configured for dual connectivity (DC), a bearer type of the UE. The bearer type may include a non-split bearer type or a split bearer type, as illustrative, non-limiting examples. The bearer type may include or correspond to bearer information 428. UE 115 may determine the bearer type using bearer logic 1006.

In some implementations, method 800 may include performing one or more Layer 2 measurements, and generating, by the UE, the UL delay measurement based on the one or more Layer 2 measurements. UE 115 may perform the measurements using measurement logic 1002. UE 115 may generate the UL delay measurement At 804, method 800 includes transmitting, from the UE, an uplink (UL) delay measurement based on the bearer type. For example, the UL delay measurement may include or correspond to D1 measurement 520, delay information 521, MN information 522, SN information, or a combination thereof. The UL delay measurement may include a UL average packet data convergence protocol (PDCP) packet queuing delay measurement (D1). UE 115 may transmit the UL delay measurement using wireless radios 1001a-r and antennas 252a-r. In some implementations, transmitting the UL delay measurement includes transmitting one or more measurement reports, such as one or more measurement reports 572.

In some implementations, method 800 may include, when the UE includes a non-split bearer, receiving, by the UE, a configuration message from a secondary node (SN) or a master node (MN). The configuration message may include or correspond to measurement configuration message 570. The UL delay measurement is transmitted to the SN or the MN from which the UE received the configuration message.

In some implementations, method 800 may include, when the UE includes a split bearer with one PDCP entity and multiple RLC legs, calculating, by the UE, the UL delay measurement for the MN and the SN. For example, the UL delay measurement may be a single value. In some implementations, method 800 further includes receiving, by the UE, a configuration message from the SN or the MN, and the UL delay measurement is transmitted to the SN or the MN from which the UE received the configuration message. Alternatively, the UL delay measurement may be transmitted to the SN and the MN.

In other implementations, method 800 may include, when the UE includes a split bearer with one PDCP entity and multiple RLC legs, calculating a first UL delay measurement for the MN and calculating a second UL delay measurement for the SN. In some implementations, method 800 further includes receiving, by the UE, a configuration message from the SN or the MN. In some such implementations, transmitting the UL delay measurement includes transmitting the first UL delay measurement, a MN indicator corresponding to the first UL delay measurement, the second UL delay measurement, a SN indicator corresponding to the second UL delay measurement, or a combination thereof, to the SN or the MN from which the UE received the configuration message. In other implementations, transmitting the UL delay measurement includes transmitting the first UL delay measurement to the MN, and transmitting the second UL delay measurement to the SN.

Thus, method 800 enables radio access network (RAN)-centric data collection for UEs configurable for DC/CA operations. For example, the operations described herein provide a Layer 2 (L2) measurement configured to support uplink (UL) delay measurement for a UE configured for dual connectivity (DC) operations. The data collection may advantageously be used to improve device (e.g., UE) performance, such as battery life, throughput, latency, reliability, and new radio (NR) functionality and/or features.

It is noted that one or more blocks (or operations) described with reference to FIGS. 6-8 may be combined with one or more blocks (or operations) of another of figure. For example, one or more blocks of FIG. 6-8 may be combined with one or more blocks (or operations) of another of FIG. 2 or 3-5. Additionally, or alternatively, one or more operations described above with reference to FIGS. 1-8 and 10 may be combine with one or more operations described with reference to FIG. 11.

FIG. 9 is a flow diagram illustrating an example method 900 performed by a network entity for communication. For example, example blocks of method 900 may cause network entity to communicate a configuration message according to some aspects of the present disclosure. The example blocks will also be described with respect to network entity 1105 as illustrated in FIG. 11. FIG. 11 is a block diagram conceptually illustrating an example design of a network entity 1105, such as base station 105, network entity 350, 450, 452, 550, 552, 1105, a network, or a core network, as illustrative, non-limiting examples.

Network entity 1105 includes the structure, hardware, and components as illustrated for network entity (e.g., 105, 350, 450, 452, 550, 552) of FIGS. 2-5. For example, network entity 1105 includes controller/processor 240, which operates to execute logic or computer instructions stored in memory 242, as well as controlling the components of network entity 1105 that provide the features and functionality of network entity 1105. Network entity 1105, under control of controller/processor 240, transmits and receives signals via wireless radios 1101*a-t* and antennas 234*a-t*. Wireless radios 1101*a-t* includes various components and hardware, as illustrated in FIG. 2 for network entity 1105 (e.g., 105), including modulator/demodulators 232*a-t*, transmit processor 220, TX MIMO processor 230, MIMO detector 236, and receive processor 238. As shown, memory 242 may include a configuration generator 1102, communication logic 1103, and a timer 1104. Configuration generator 1102 may be configured to generate one or more configurations or configuration messages, such as measurement configuration 370, configuration message 470, or measurement configuration message 570. Communication logic 1103 may enable network entity 1105 to perform one or more operations for wireless communication. Timer 1104 may be configured to enable network entity 1105 to determine expiration of one or more time periods. In some aspects, configuration generator 1102, communication logic 1103, and timer 1104, or a combination thereof, may include or correspond to processor(s) 362. Network entity 1105 may receive signals from and/or transmit signal to a UE, such as UE 115 as illustrated in FIG. 10.

Referring to FIG. 9, a sample flow diagram of method 900 of network entity operations for communication is shown. In some implementations, method 900 may be performed by a network entity 601 (e.g., 105, 140, 442). In other implementations, method 900 may be performed by an apparatus configured for wireless communication. For example, the apparatus may include at least one processor, and a memory coupled to the processor. The processor may be configured to perform operations of method 900. In other implementations, method 900 may be performed or executed using a non-transitory computer-readable medium having program code recorded thereon. The program code may be program code executable by a computer for causing the computer to perform operations of method 900.

As illustrated at block 902, method 900 includes a network entity transmitting a measurement configuration message. The measurement configuration message may include or correspond to measurement configuration 307 For example, network entity 1105 may generate the measurement configuration message using configuring generator 1102. Network entity 1105 may transmit the measurement configuration message using wireless radios 1101*a-t*, antennas 234*a-t*, and communication logic 1103.

The measurement configuration message may include a storage configuration, a reporting configuration, or a combination thereof. The storage configuration may include a storage configuration for a minimization of drive test (MDT) result, an early measurement result, or a combination thereof. The reporting configuration may include a reporting configuration for the MDT result, the early measurement result, or a combination thereof. Additionally, or alternatively, the measurement configuration message may include an information request for one or more MDT results, one or more early measurement results, or a combination thereof.

At 904, method 900 further includes the network entity receiving the MDT result, the early measurement result, or a combination thereof. In some implementations, the early measurement result includes a dual connectivity/carrier aggregation (DC/CA) early measurement result. The MDT result, the early measurement result, or a combination thereof, received by the network entity may include or correspond to measurement log(s) 372. To illustrate, network entity 601 may receive the MDT result, the early measurement result, or a combination thereof using wireless radios 1101*a-t*, antennas 234*a-t*, and communication logic 1103. The, the MDT result, the early measurement result, or a combination thereof, may be received from a UE, such as UE 115.

In some implementations, the storage configuration indicates to store the minimization of drive test (MDT) result and the early measurement result in a single log file. In other implementations, the storage configuration indicates to store the MDT result in a first log file and the early measurement result in a second log file. Additionally, or alternatively, the reporting configuration may indicate to transmit the MDT result and the early measurement result in the same report message or in separate report messages.

Thus, method 900 enables radio access network (RAN)-centric data collection for UEs configurable for DC/CA operations. For example, the operations described herein provide collection, storage, reporting, or a combination thereof, of a DC/CA early measurement result in association with a logged minimization of drive test (MDT). The data collection may advantageously be used to improve device (e.g., UE) performance, such as battery life, throughput, latency, reliability, and new radio (NR) functionality and/or features.

It is noted that one or more blocks (or operations) described with reference to FIG. 9 may be combined with one or more blocks (or operations) of another of figure. For example, one or more blocks of FIG. 9 may be combined with one or more blocks (or operations) of another of FIG. 2 or 3-5. Additionally, or alternatively, one or more operations described above with reference to FIGS. 1-5, 9, and 11 may be combine with one or more operations described with reference to FIG. 10.

In some aspects, data collection for dual connectivity (DC)/carrier aggregation (CA) may include a wireless device receiving determining, by a user equipment (UE), a minimization of drive test (MDT) result; determining an early measurement result; and transmitting a report including the MDT result, the early measurement result, or a combination thereof. In some implementations, the wireless device may include at least one processor, and a memory coupled to the processor. The processor may be configured to perform operations described herein with respect to the wireless device. In other implementations, a non-transitory computer-readable medium having program code recorded thereon and the program code may be executable by a computer for causing the computer to perform operations described herein with reference to the wireless device.

In a first aspect, the early measurement result includes a dual connectivity/carrier aggregation (DC/CA) early measurement result.

In a second aspect, alone or in combination with the first aspect, the early measurement result includes a camping frequency measurement, a non-camping frequency measurement, or a combination thereof; and the early measurement result is determined by the UE in a non-active state.

In a third aspect, alone or in combination with one or more of the first through second aspects may include determining location information associated with a MDT; and storing the early measurement result with the location information.

In a fourth aspect, alone or in combination with one or more of the first through third aspects, early measurement result information is determined according to a first interval; and MDT result information is determined according to a second interval.

In a fifth aspect, alone or in combination with one or more of the first through fourth aspects, the first interval and the second interval are the same interval.

In a sixth aspect, alone or in combination with one or more of the first through fifth aspect, the first interval and the second interval are different.

In a seventh aspect, alone or in combination with one or more of the first through sixth aspects may include generating a first log of one or more MDT result entries; and generating a second log of one or more early measurement result entries.

In an eighth aspect, alone or in combination with the seventh aspect may include generating a blank early measurement result entry when an early measurement result is unavailable.

In a ninth aspect, alone or in combination with one or more of the first through eighth aspects may include receiving, from a network element, a measurement configuration message, the measurement configuration message including a storage configuration, reporting configuration, or a combination.

In a tenth aspect, alone or in combination with the ninth aspect may include storing, based on the measurement configuration message, the MDT result and the early measurement result in the same log file.

In an eleventh aspect, alone or in combination with the ninth aspect may include storing, based on the measurement configuration message, the MDT result in a first log file and the early measurement result in a second log file.

In a twelfth aspect, alone or in combination with one or more of the first through eleventh aspects, transmitting the report includes transmitting a first report including the MDT result; transmitting a second report including the early measurement result; or a combination thereof.

In a thirteenth aspect, alone or in combination with the twelfth aspect may include receiving, from a network entity, an information request for one or more MDT results, one or more early measurement results, or a combination thereof.

In some aspects, data collection for dual connectivity (DC)/carrier aggregation (CA) may include a wireless device transmitting, by a network entity, a measurement configuration message, the measurement configuration message including: a storage configuration for a minimization of drive test (MDT) result, an early measurement result, or a combination thereof; a reporting configuration for the MDT result, the early measurement result, or a combination thereof; or a combination of the storage configuration and the reporting configuration; and receiving, by the network entity, the MDT result, the early measurement result, or a combination thereof. In some implementations, the wireless device may include at least one processor, and a memory coupled to the processor. The processor may be configured to perform operations described herein with respect to the wireless device. In other implementations, a non-transitory computer-readable medium having program code recorded thereon and the program code may be executable by a computer for causing the computer to perform operations described herein with reference to the wireless device.

In a fourteenth aspect, the early measurement result includes a dual connectivity/carrier aggregation (DC/CA) early measurement result.

In a fifteenth aspect, alone or in combination with the fourteenth aspect, the storage configuration indicates to store the minimization of drive test (MDT) result and the early measurement result in a single log file.

In a sixteenth aspect, alone or in combination with one or more of the fourteenth through fifteenth aspect, the storage configuration indicates to store the MDT result in a first log file and the early measurement result in a second log file.

In a seventeenth aspect, alone or in combination with one or more of the fourteenth through sixteenth aspects, the reporting configuration indicates to transmit the MDT result and the early measurement result in the same report message or in separate report messages.

In an eighteenth aspect, alone or in combination with one or more of the fourteenth through seventeenth aspects, the measurement configuration message includes an information request for one or more MDT results, one or more early measurement results, or a combination thereof.

In some aspects, data collection for dual connectivity (DC)/carrier aggregation (CA) may include a wireless device generating, by a user equipment (UE), a radio link failure (RLF) report based on detection of a master cell group (MCG) fast recovery failure, the RLF report including MCG failure information, MCG recovery failure information, or a combination thereof; and transmitting, by the UE, the RLF report to a secondary cell group (SCG). In some implementations, the wireless device may include at least one processor, and a memory coupled to the processor. The processor may be configured to perform operations described herein with respect to the wireless device. In other implementations, a non-transitory computer-readable medium having program code recorded thereon and the program code may be executable by a computer for causing the computer to perform operations described herein with reference to the wireless device.

In a nineteenth aspect, the UE is a dual connectivity/carrier aggregation (DC/CA) configuration.

In a twentieth aspect, alone or in combination with the nineteenth aspect, the MCG failure information includes an available measurement result of the MCG, a MCG link failure cause, an available measurement result of the SCG, an available measurement result of a non-serving cell, or a combination thereof.

In a twenty-first aspect, alone or in combination with one or more of the nineteenth through twentieth aspects, the MCG recovery failure information includes an available measurement result of the SCG, an available measurement result of the MCG, an available secondary node (SN) measurement result, or a combination thereof.

In a twenty-second aspect, alone or in combination with one or more of the nineteenth through twenty-first aspects, the MCG recovery failure information includes an MCG recovery failure cause.

In a twenty-third aspect, alone or in combination with the twenty-second aspect, the MCG recovery failure cause includes a guard timer expiration indication or a SCG link failure detection.

In a twenty-fourth aspect, alone or in combination with one or more of the nineteenth through twenty-third aspects, the MCG recovery failure information includes a signaling radio bearer type.

In a twenty-fifth aspect, alone or in combination with the twenty-fourth aspect, the signaling radio bearer (SRB) type includes a split SRB or a SRB type 3 (SRB3).

In a twenty-sixth aspect, alone or in combination with one or more of the nineteenth through twenty-fifth aspects, the fast MCG recovery failure is based on expiration of a guard time, RLFs for both the MCG and SCG, or failure to apply a radio resource control (RRC) reconfiguration message.

In some aspects, data collection for dual connectivity (DC)/carrier aggregation (CA) may include a wireless device determining, by a user equipment (UE) configured for dual connectivity (DC), a bearer type of the UE; and transmitting, from the UE, an uplink (UL) delay measurement based on the bearer type. In some implementations, the wireless device may include at least one processor, and a memory coupled to the processor. The processor may be configured to perform operations described herein with respect to the wireless device. In other implementations, a non-transitory computer-readable medium having program code recorded thereon and the program code may be executable by a computer for causing the computer to perform operations described herein with reference to the wireless device.

In a twenty-seventh aspect, the bearer type includes a non-split bearer type or a split bearer type.

In a twenty-eighth aspect, alone or in combination with the twenty-seventh aspect, the UL delay measurement includes a UL average packet data convergence protocol (PDCP) packet queuing delay measurement (D1).

In a twenty-ninth aspect, alone or in combination with one or more of the twenty-seventh through twenty-eighth aspects may include performing one or more Layer 2 measurements; and generating the UL delay measurement based on the one or more Layer 2 measurements.

In a thirtieth aspect, alone or in combination with one or more of the twenty-seventh through twenty-ninth aspects may include: when the UE includes a non-split bearer, receiving a configuration message from a secondary node (SN) or a master node (MN); and where the UL delay measurement is transmitted to the SN or the MN from which the UE received the configuration message.

In a thirty-first aspect, alone or in combination with one or more of the twenty-seventh through twenty-ninth aspects may include, when the UE includes a split bearer with one PDCP entity and multiple RLC legs, calculating the UL delay measurement for the MN and the SN.

In a thirty-second aspect, alone or in combination with the thirty-first aspect, the UL delay measurement is a single value.

In a thirty-third aspect, alone or in combination with one or more of the thirty-first through thirty-second aspects may include receiving a configuration message from the SN or the MN; and where the UL delay measurement is transmitted to the SN or the MN from which the UE received the configuration message.

In a thirty-fourth aspect, alone or in combination with one or more of the thirty-first through thirty-third aspects, the UL delay measurement is transmitted to the SN and the MN.

In a thirty-fifth aspect, alone or in combination with one or more of the thirty-first through thirty-second aspects may include, when the UE includes a split bearer with one PDCP entity and multiple RLC legs: calculating a first UL delay measurement for the MN; and calculating a second UL delay measurement for the SN.

In a thirty-sixth aspect, alone or in combination with the thirty-fifth aspect may include receiving a configuration message from the SN or the MN; and where transmitting the UL delay measurement includes transmitting the first UL delay measurement, a MN indicator corresponding to the first UL delay measurement, the second UL delay measurement, and a SN indicator corresponding to the second UL delay measurement to the SN or the MN from which the UE received the configuration message.

In a thirty-seventh aspect, alone or in combination the thirty-fifth aspect, transmitting the UL delay measurement includes transmitting the first UL delay measurement to the MN; and transmitting the second UL delay measurement to the SN.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 1-11 described herein include processors, electronics devices, hardware devices, electronics components, logical circuits, memories, software codes, firmware codes, etc., or any combination thereof. In addition, features discussed herein may be implemented via specialized processor circuitry, via executable instructions, and/or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be implemented directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method for wireless communication performed by a user equipment (UE), the method comprising:
determining a minimization of drive test (MDT) result;
determining an early measurement result comprising a camping frequency measurement, a non-camping frequency measurement, or a combination thereof; and

transmitting a report including the MDT result, the early measurement result, or a combination thereof, based at least in part on a storage configuration for logging results and a reporting configuration for reporting results, wherein the storage configuration received in a measurement configuration indicates whether the MDT result and the early measurement result are to be stored in a single log file or in different log files.

2. The method of claim 1, wherein the early measurement result includes a dual connectivity/carrier aggregation (DC/CA) early measurement result.

3. The method of claim 1, wherein
the early measurement result is determined by the UE in a non-active state.

4. The method of claim 1, further comprising:
determining location information associated with a MDT; and
storing the early measurement result with the location information.

5. The method of claim 1, wherein:
early measurement result information is determined according to a first interval; and
MDT result information is determined according to a second interval.

6. The method of claim 5, wherein the first interval and the second interval are a same interval.

7. The method of claim 1, further comprising:
generating a first log of one or more MDT result entries; and
generating a second log of one or more early measurement result entries.

8. The method of claim 1, further comprising generating a blank early measurement result entry when an early measurement result is unavailable.

9. The method of claim 1, further comprising receiving, from a network element, a measurement configuration message, the measurement configuration message including the storage configuration, the reporting configuration, or a combination.

10. The method of claim 1, wherein transmitting the report comprises:
transmitting a first report including the MDT result;
transmitting a second report including the early measurement result; or
a combination thereof.

11. A method for wireless communication performed by a network entity, the method comprising:
transmitting a measurement configuration message, the measurement configuration message including:
a storage configuration for logging a minimization of drive test (MDT) result, an early measurement result, or a combination thereof, wherein the storage configuration transmitted in the measurement configuration indicates whether the MDT result and the early measurement result are to be stored in a single log file or in different log files; and
a reporting configuration for reporting the MDT result, the early measurement result, or a combination thereof; and
receiving the MDT result, the early measurement result, or a combination thereof, wherein the early measurement result comprises a camping frequency measurement, a non-camping frequency measurement, or a combination thereof.

12. The method of claim 11, wherein the early measurement result includes a dual connectivity/carrier aggregation (DC/CA) early measurement result.

13. The method of claim 11, wherein:

the reporting configuration is configured to indicate to transmit the MDT result and the early measurement result in a same report message or in separate report messages; or the measurement configuration message includes an information request for one or more MDT results, one or more early measurement results, or a combination thereof.

14. A user equipment (UE) configured for wireless communication, the UE comprising:

at least one processor; and a memory coupled to the at least one processor, wherein the at least one processor is configured to:

determine a minimization of drive test (MDT) result;

determine an early measurement result comprising a camping frequency measurement, a non-camping frequency measurement, or a combination thereof; and initiate transmission of a report including the MDT result, the early measurement result, or a combination thereof, based at least in part on a storage configuration for logging results and a reporting configuration for reporting results, wherein the storage configuration received in a measurement configuration indicates whether the MDT result and the early measurement result are to be stored in a single log file or in different log files.

15. The UE of claim 14, wherein the early measurement result includes a dual connectivity/carrier aggregation (DC/CA) early measurement result.

16. The UE of claim 14, wherein the early measurement result is determined by the UE in a non-active state.

17. The UE of claim 14, wherein the at least one processor is configured to:

determine location information associated with a MDT; and store the early measurement result with the location information.

18. The UE of claim 14, wherein:

early measurement result information is determined according to a first interval; and MDT result information is determined according to a second interval.

19. The UE of claim 18, wherein the first interval and the second interval are different.

20. The UE of claim 14, wherein the at least one processor is configured to:

generate a first log of one or more MDT result entries; and generate a second log of one or more early measurement result entries.

21. The UE of claim 14, wherein the at least one processor is configured to generate a blank early measurement result entry when an early measurement result is unavailable.

22. The UE of claim 14, wherein the at least one processor is configured to receive, from a network element, a measurement configuration message, the measurement configuration message including the storage configuration, the reporting configuration, or a combination.

23. The UE of claim 14, wherein, to transmit the report, the at least one processor is configured to:

initiate transmission of a first report including the MDT result;

initiate transmission of a second report including the early measurement result; or a combination thereof.

* * * * *